(12) United States Patent
Ishizaki et al.

(10) Patent No.: US 7,621,500 B2
(45) Date of Patent: Nov. 24, 2009

(54) DISPLAY HOLDING DEVICE

(75) Inventors: Takashi Ishizaki, Shizuoka (JP);
Kenichi Hasegawa, Tokyo (JP)

(73) Assignees: Murakami Corporation, Shizuoka-shi
(JP); NEC Display Solutions, Ltd.,
Tokyo (JP)

( * ) Notice: Subject to any disclaimer, the term of this
patent is extended or adjusted under 35
U.S.C. 154(b) by 42 days.

(21) Appl. No.: 11/067,674

(22) Filed: Mar. 1, 2005

(65) Prior Publication Data

US 2005/0224682 A1 Oct. 13, 2005

(30) Foreign Application Priority Data

Apr. 9, 2004 (JP) .............................. 2004-116114

(51) Int. Cl.
*F16M 13/00* (2006.01)
(52) U.S. Cl. ...................................... 248/371; 248/917
(58) Field of Classification Search ................. 248/917,
248/918, 919, 920, 921, 922, 923, 924, 371,
248/372.1
See application file for complete search history.

(56) References Cited

U.S. PATENT DOCUMENTS 5,007,608 A * 4/1991 Carroll, Jr. ............. 248/297.21

2003/0231460 A1 * 12/2003 Moscovitch ................. 361/681
2004/0011938 A1 * 1/2004 Oddsen, Jr. .................. 248/393
2004/0056161 A1 * 3/2004 Ishizaki et al. ........... 248/176.3

FOREIGN PATENT DOCUMENTS

| JP | 2003-216058 | | 7/2003 |
| JP | 2000-29397 | * | 4/2004 |
| WO | WO 03/050787 | | 6/2003 |
| WO | WO 03/092341 A2 | * | 11/2003 |

\* cited by examiner

*Primary Examiner*—Amy J. Sterling
*Assistant Examiner*—Steven M Marsh
(74) *Attorney, Agent, or Firm*—Oblon, Spivak, McClelland,
Maier & Neustadt, L.L.P.

(57) ABSTRACT

Disclosed is a display holding device which retains one or more displays in such a way that they move laterally and smoothly. The display holding device, which is installed between at least one display and a supporting body supporting the display, includes (1) a guide mechanism secured to the supporting body, and (2) at least one holding mechanism for transmitting, to the guide mechanism, a moment due to weight of the display, and being secured to the display. In addition, the guide mechanism includes (a) a guide portion spanning laterally, and (b) a stopper placed along the guide portion. The holding mechanism includes (c) a slider mating with the guide portion in a slidable manner, and (d) a contact portion facing the stopper. The stopper blocks the contact portion from being displaced in the direction of the moment, and allows it to be displaced in the opposite direction.

19 Claims, 20 Drawing Sheets

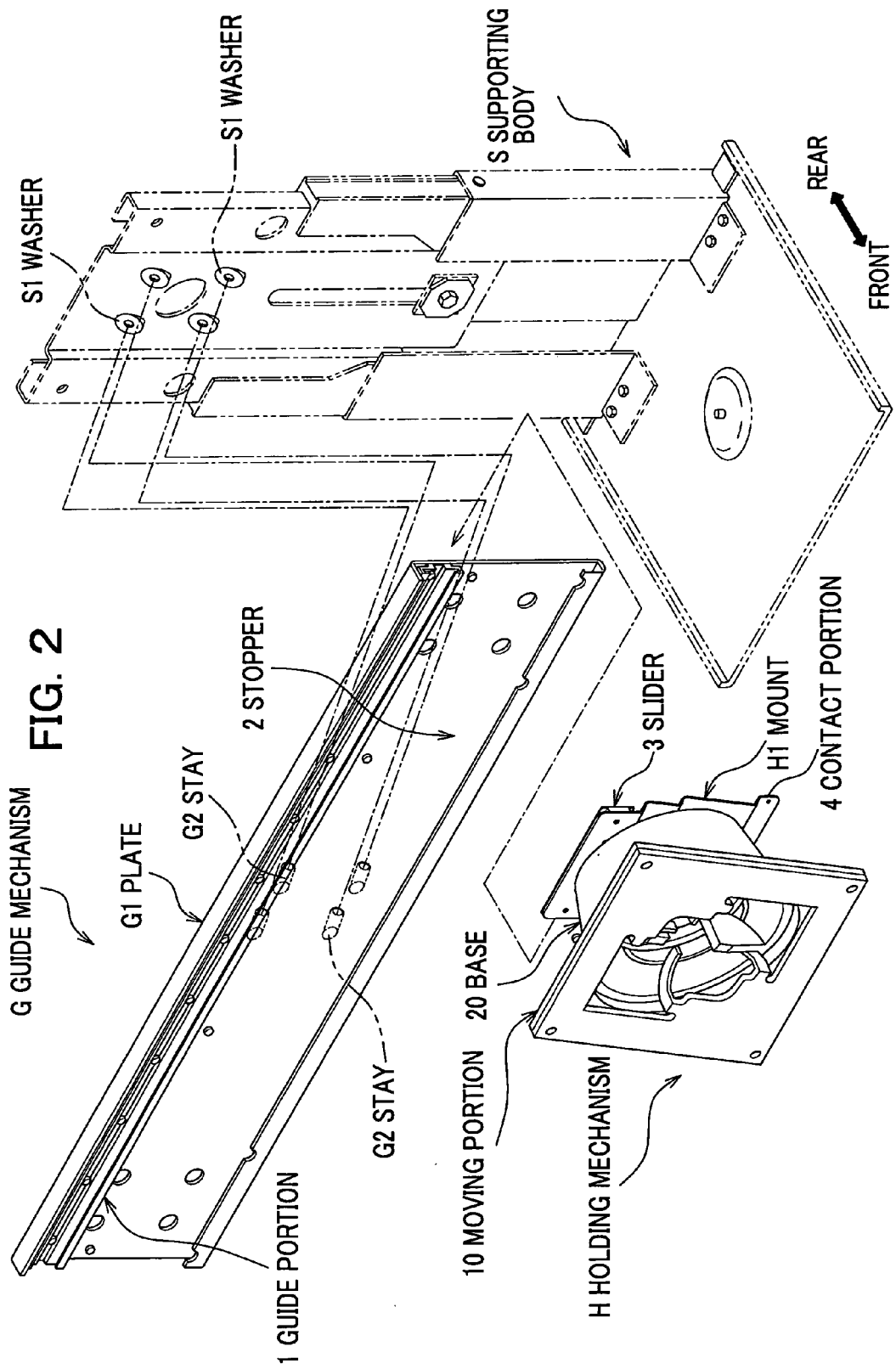

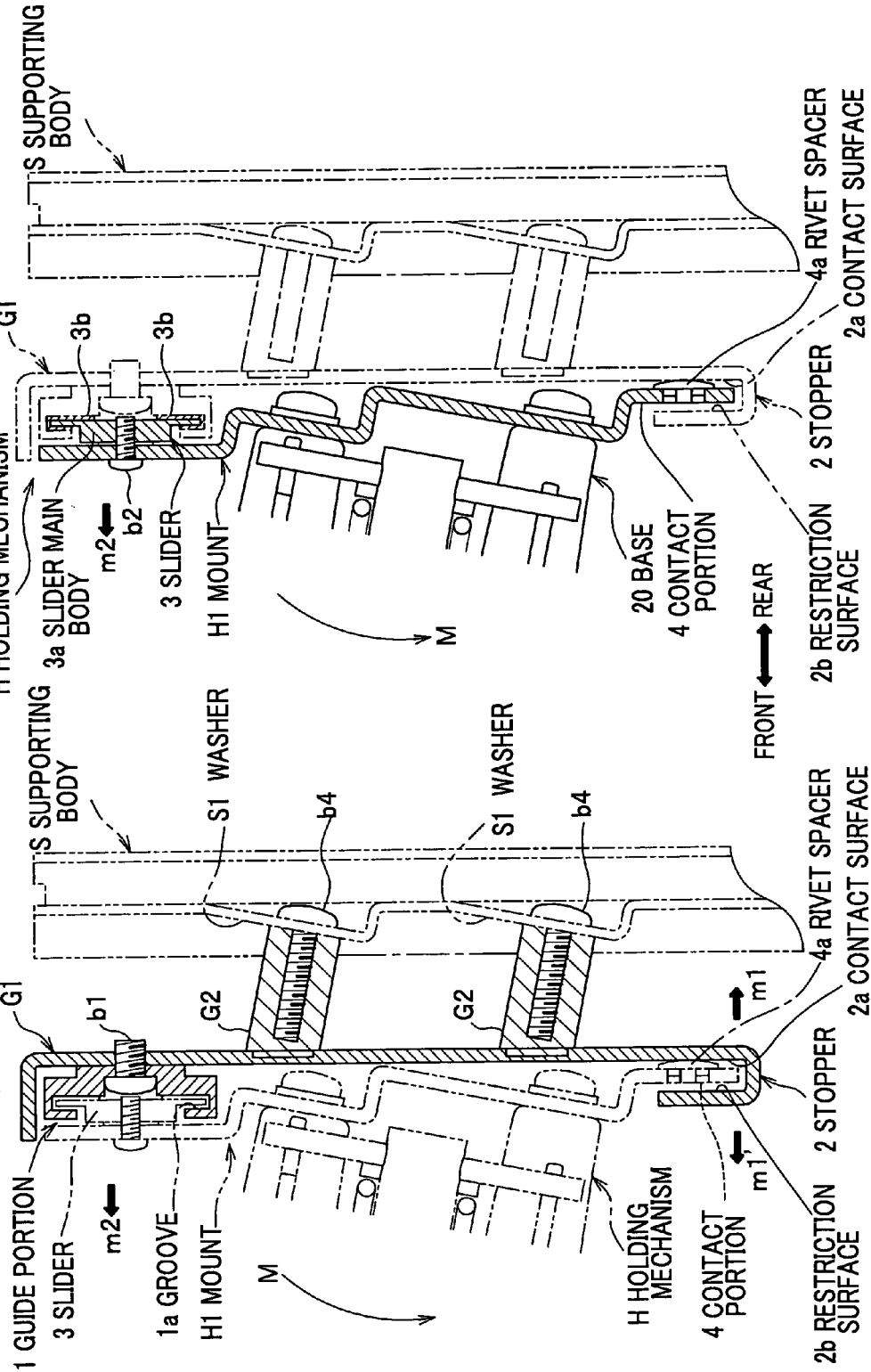

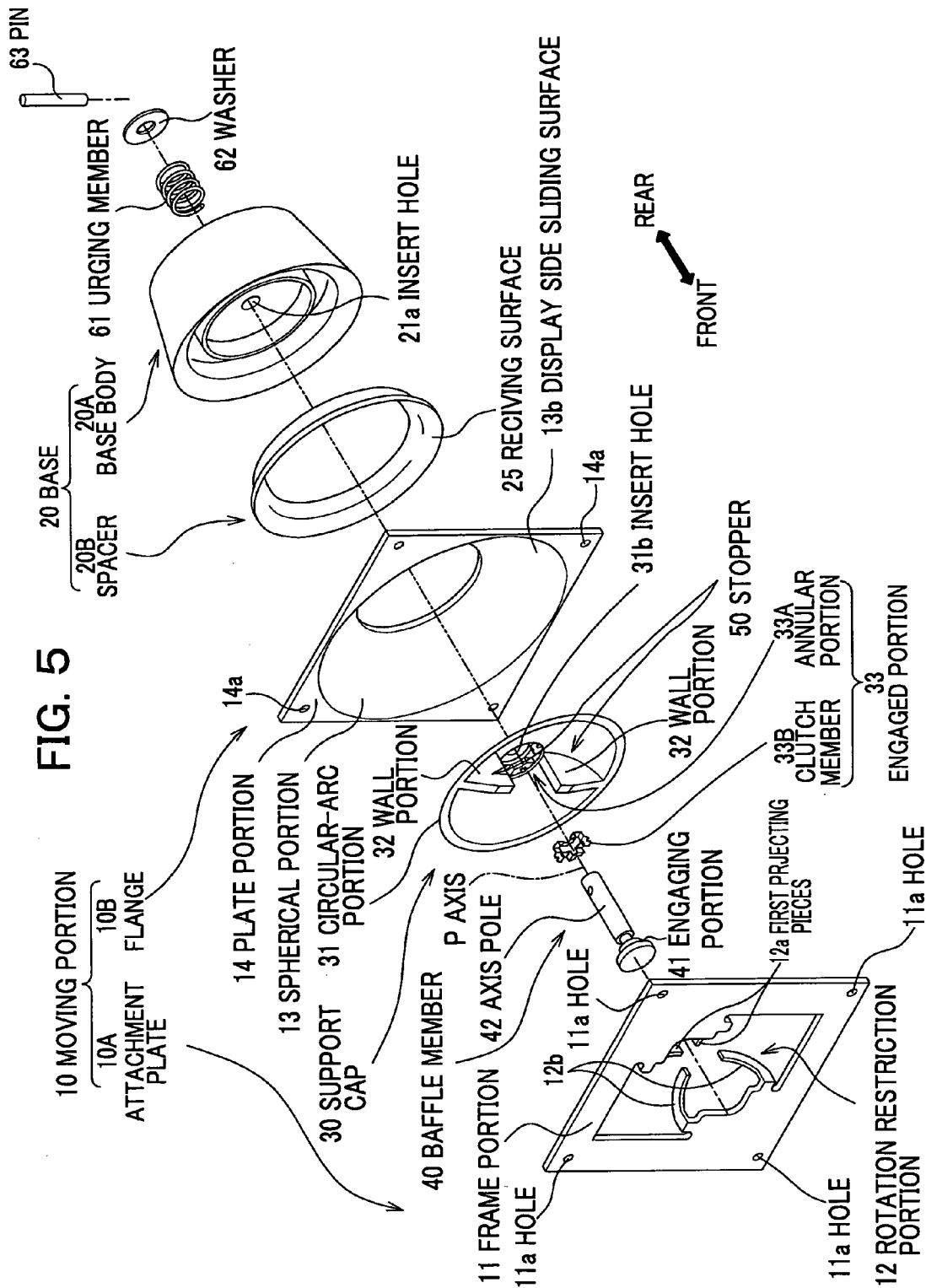

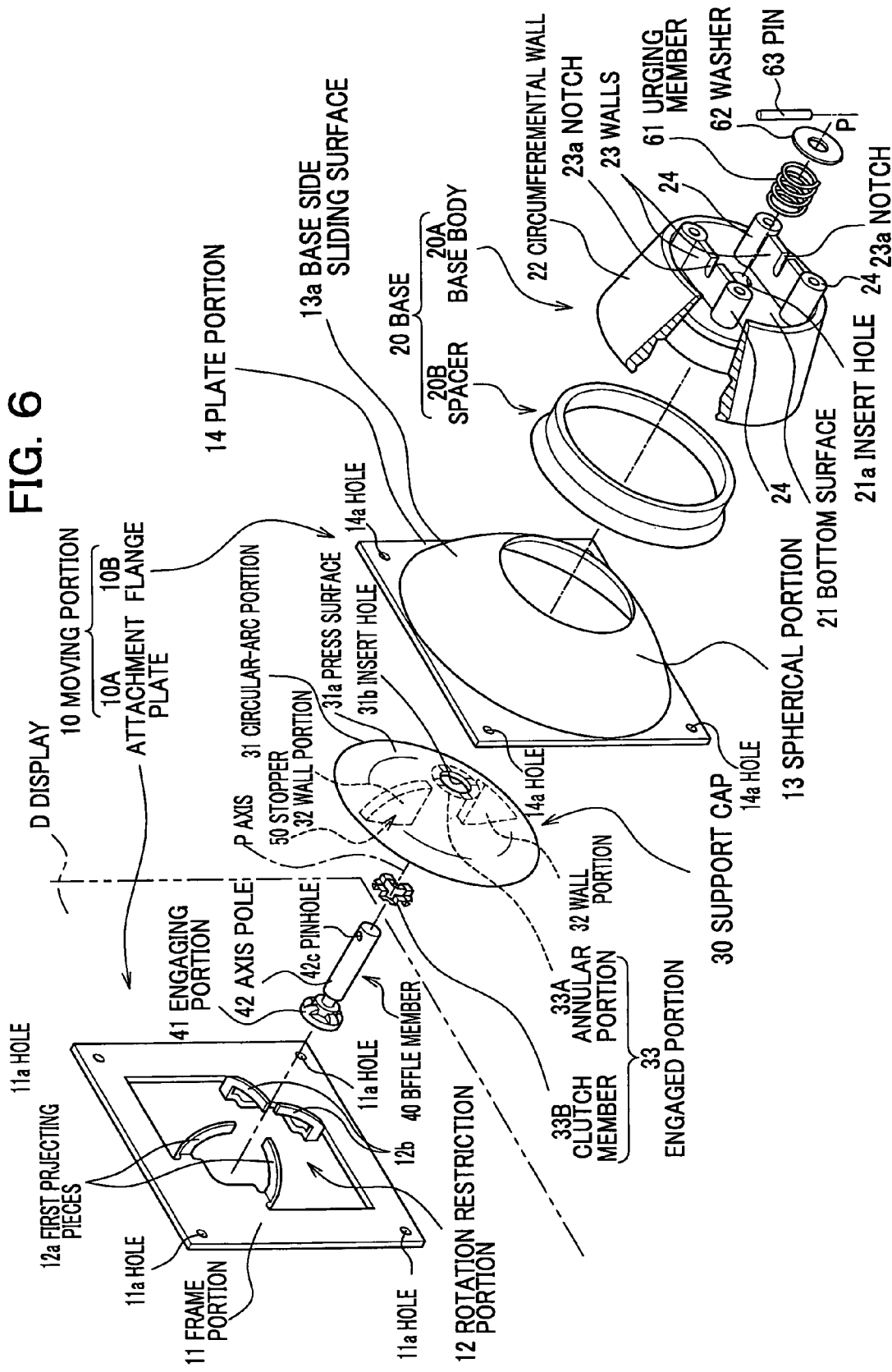

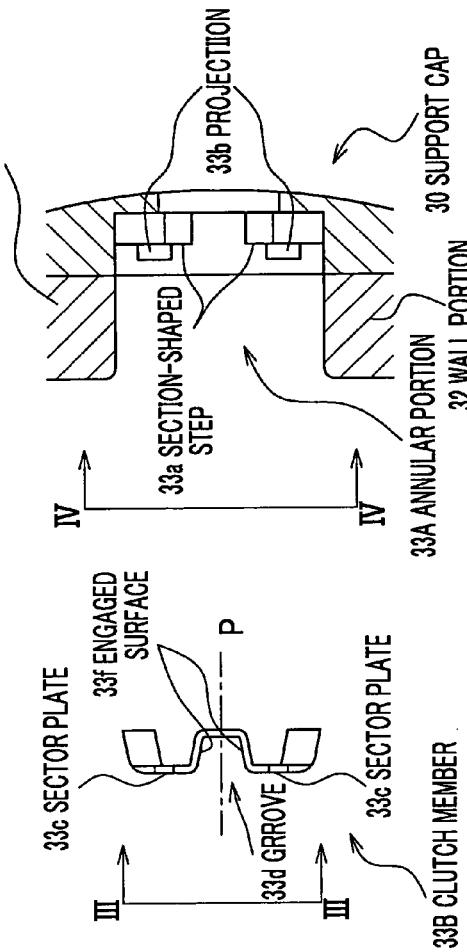
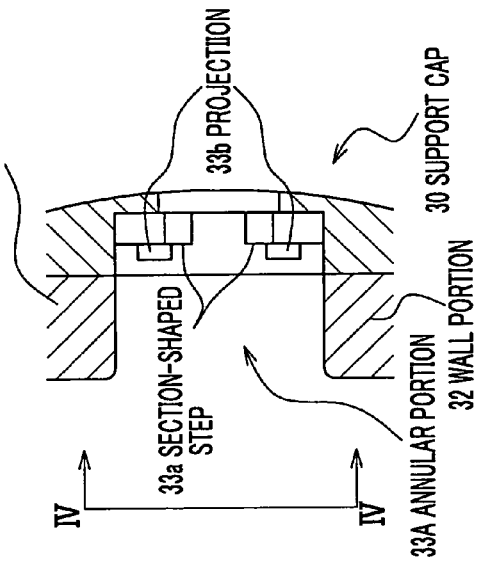
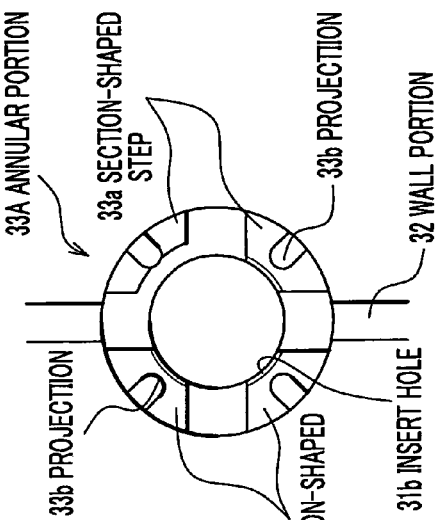
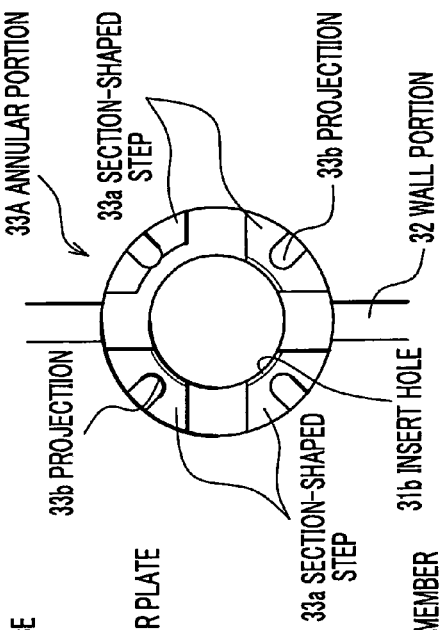
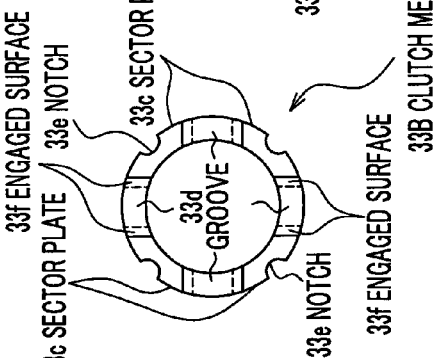
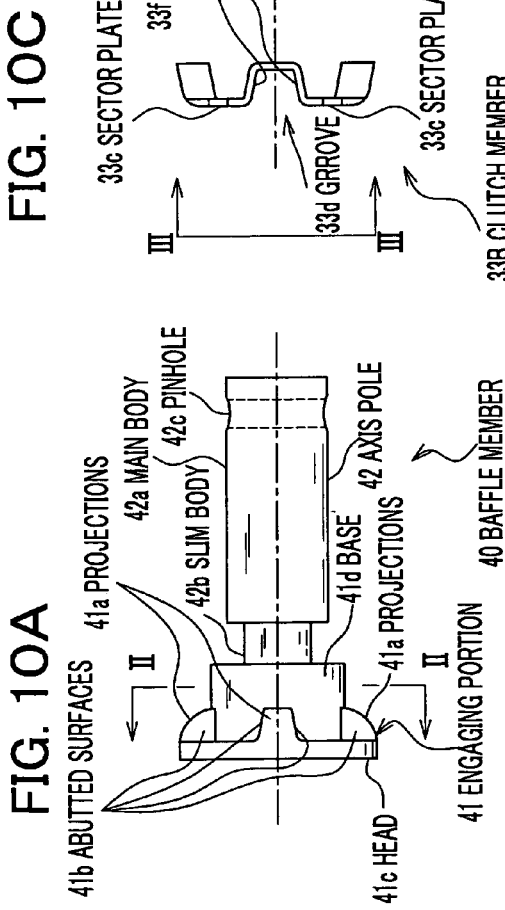
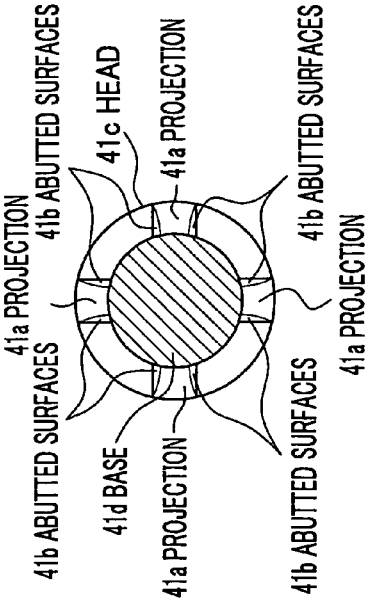

FRONT ⟷ REAR

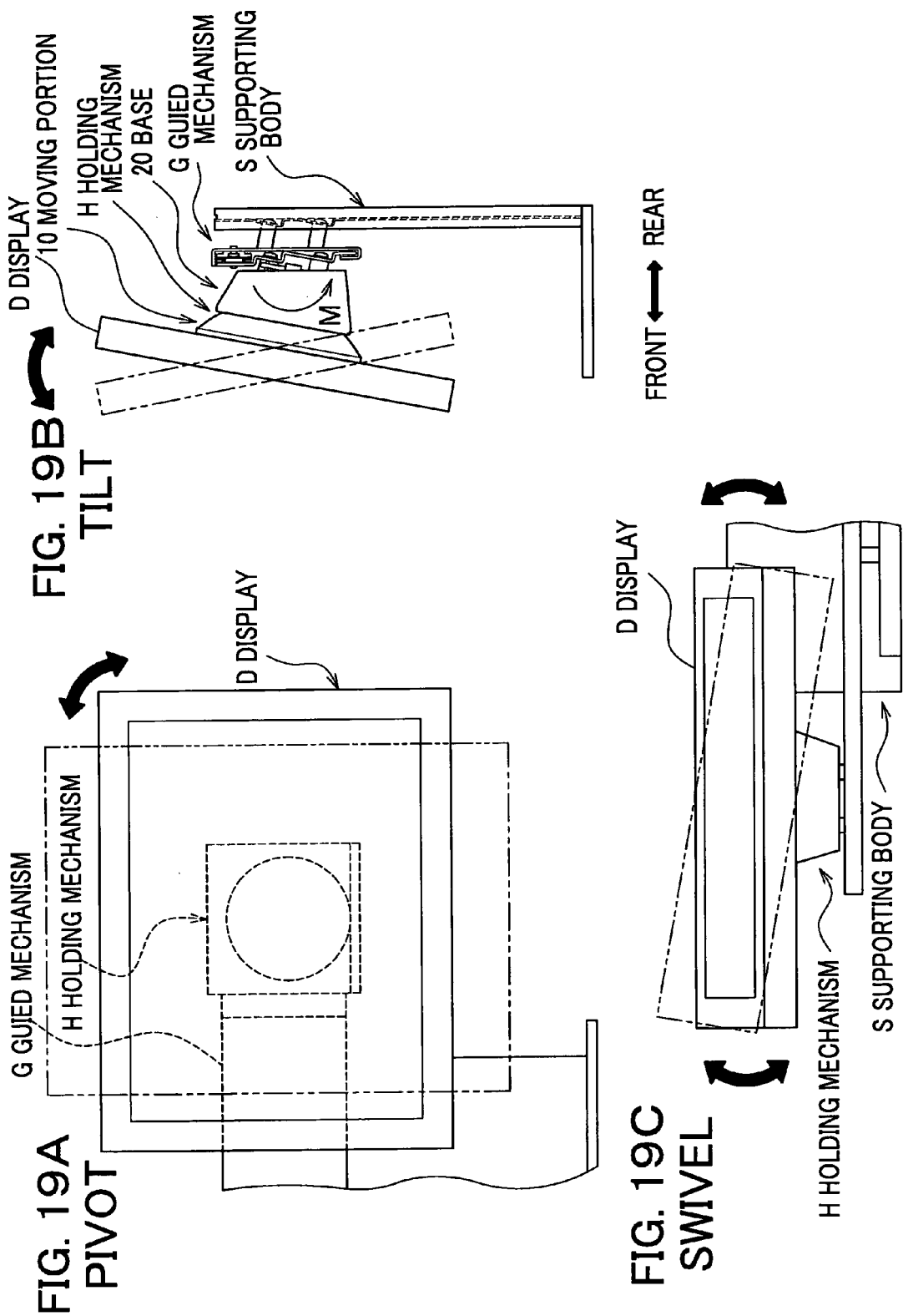

DISPLAY HOLDING DEVICE

CROSS-REFERENCE TO RELATED APPLICATIONS

This application claims the benefit of priority from the prior Japanese Patent Application No. 2004-116114, filed Apr. 9, 2004, the entire contents of which are incorporated herein by reference.

BACKGROUND OF THE INVENTION

1. Field of the Invention

The present invention relates to a display holding device which retains one or more displays in such a way that they can move laterally.

2. Description of the Related Art

Conventionally, as a display holding device which retains a display (or monitor) for computers, TV sets or the like in such a way that it can move laterally, one described in Japanese Unexamined Patent Application Publication 2000-029397 has been known.

As shown in FIG. 20A, this display holding device is installed between a display D and a supporting body S such as a wall surface which serves as a base. The display holding device is composed of a guide portion 100 and a holding mechanism 200, the guide portion 100 being secured to the supporting body S, the holding mechanism 200 being coupled to the display D.

The guide portion 100 includes a rear plate 101, an upper plate 102, a lower plate 103, a first front plate 104 and a second front plate 105. The rear plate 101 is secured to the supporting body S. The upper and lower plates 102 and 103 extend forward from the upper and lower edges of the rear plate 101, respectively. The first and second front plates 104 and 105 extend downward and upward from the front edges of the upper and lower plates 102 and 103, respectively.

The holding mechanism 200 is provided with a sliding portion 201 that slides on the guide portion 100. The sliding portion 201 is made of a block-shaped member that is accommodated in the guide portion 100. The rear, lower and front sides of the sliding portion 201 are abutted on the rear plate 101, the lower plate 103 and both the first and second front plates 104 and 105 of the guide portion 100 in this order. Note that the reason why the sliding portion 201 is abutted on the inner sides of the guide portion 100 is to prevent the display D from being unstable.

In this case, the sliding portion 201 of the holding mechanism 200 undergoes the weight J of the display D and a moment M produced due to the weight J, as shown in FIG. 20B. Therefore, the guide portion 100 goes through a vertical force $F_V$ due to the weight J, and both the first front plate 104 and the rear plate 101 experience horizontal forces $F_{H1}$ and $F_{H2}$ due to the moment M, respectively. Furthermore, the lower, front and rear sides of the sliding portion 201 each bear drags of the same magnitude as vertical and horizontal forces $F_V$, $F_{H1}$ and $F_{H2}$, as their reaction forces.

Accordingly, when the display D shown in FIG. 20A moves laterally, a resisting force exerts the sliding portion 201 because of these drags. As a result, the display D is inhibited from moving smoothly. In addition, if the supporting body S is a stand on a desk, then it may be displaced. The magnitude of the moment M is in proportion to the distance between the display D and the guide portion 100. In other words, as this distance is increased, the above disadvantage inevitably becomes noticeable.

Taking the above disadvantage into account, the present invention has been conceived. An object of the present invention is to provide a display holding device which retains one or more displays in such a way that they move laterally and smoothly.

SUMMARY OF THE INVENTION

According to an aspect of the present invention, there is provided, a display holding device which is installed between at least one display and a supporting body that supports the display, and which includes:

(1) a guide mechanism being secured to the supporting body, and
(2) at least one holding mechanism for transmitting, to the guide mechanism, a moment due to weight of the display, the holding mechanism being secured to the display.

In addition, the guide mechanism includes (a) a guide portion spanning laterally, and (b) a stopper being placed along the guide portion. The holding mechanism includes (c) a slider mating with the guide portion in a slidable manner, and (d) a contact portion being placed facing the stopper. The stopper blocks the contact portion from being displaced in a direction of the moment, and allows it to be displaced in an opposite direction of the moment.

In this display holding device, the contact portion of the holding mechanism is configured to be displaced in the opposite direction of the moment due to the weight of the display. Accordingly, when moving the display laterally, an operator slopes it in the opposite direction of the moment (i.e. upward), while applying a lateral force to the display. This decreases the frictional force acting on both the holding mechanism and the guide mechanism, thereby enabling the display to move laterally and smoothly.

Specifically, in this display holding device, the holding mechanism can move along the guide mechanism, while the contact portion of the holding mechanism is away from the stopper of the guide mechanism, that is, while any frictional force due to the moment does not act on the contact portion. As a result, it is possible to move the display laterally and smoothly. In this case, to move the contact portion of the holding mechanism in the opposite direction of the moment, an operator merely slopes the display secured to the holding mechanism in the opposite direction (i.e. upward). In this state, once the operator applies a lateral force to the display, the holding mechanism slides along the guide mechanism. Furthermore, in order to retain multiple displays, multiple holding mechanisms may be provided, and the displays may be secured to the corresponding holding mechanisms. In this case, an operator can move the displays laterally and individually of one another, or together while their adjacent side surface(s) keep or keeps in contact with one another.

According to another aspect of the present invention, in the above display holding device, the holding mechanism includes a moving portion secured to a rear surface of the display, and a base which forms a single unit with the slider and the contact portion and which supports the moving portion in such a way that it rotates on an axis being substantially perpendicular to a screen of the display.

The above structure enables the display to pivot on its central point. If multiple displays are retained by the corresponding holding mechanisms, then the portrait and landscape-oriented displays can be arranged in contact with each other.

According to still another aspect of the present invention, in the above display holding device, the holding mechanism includes a moving portion secured to a rear surface of the display, and a base forming a single unit with the slider and the contact portion. In addition, the moving portion has a spherical sliding surface on its rear, and the base has, on its front, a receiving surface being abutted on the sliding surface in a slidable manner.

The above structure enables the display to tilt upward and downward, or to swivel right and left. This makes it possible to adjust the orientation of the display with more flexibility. If multiple displays are retained by the corresponding holding mechanisms, then the displays can be tilted or swiveled independently of one another, or together while their adjacent side surface(s) keep or keeps in contact with one another.

In conclusion, with the display holding device of the present invention, the display can be moved laterally and smoothly. Furthermore, when multiple displays are retained by corresponding holding mechanisms, the displays can be moved independently of one another or together while their adjacent side surface(s) keep or keeps in contact with one another. In addition, the displays can be tilted or swivel independently of one another or together while their adjacent side surface(s) keep or keeps in contact with one another.

BRIEF DESCRIPTION OF THE DRAWINGS

For more complete understanding of the present invention and the advantages hereof, reference is now made to the following description taken in conjunction with the accompanying drawings wherein:

FIG. 2 is an exploded perspective view depicting the display holding device;

FIG. 4A is a cross-sectional view depicting the guide mechanism;

FIG. 4B a cross-sectional view depicting the holding mechanism;

FIG. 5 is an exploded perspective view depicting a moving portion and a base of the holding mechanism, as seen from the front;

FIG. 6 is an exploded perspective view depicting the moving portion and the base, as seen from the rear;

FIG. 10A is a side view depicting a baffle member 40;

FIG. 10B is a cross-sectional view taken on line II-II of FIG. 10A;

FIG. 10C is a side view depicting a clutch member;

FIG. 10D is a view of FIG. 10C, as seen from an arrow III-III;

FIG. 10E is a side cross-sectional view depicting the support cap;

FIG. 10F is a view of FIG. 10E, as seen from the direction of an arrow IV-IV;

FIG. 19A is an illustration explaining the movement of the display;

FIG. 19B is an illustration explaining the movement of the display;

FIG. 19C is an illustration explaining the movement of the display;

DETAILED DESCRIPTION OF THE EXEMPLARY EMBODIMENTS OF THE INVENTION

A description will be given below in detail of embodiments of the present invention, with reference to accompanying figures.

In the following embodiments, a side where a display D is located is indicated by "front", and a side where a supporting body S is located is indicated by "rear", as shown in FIG. 19B. Furthermore, to "pivot" the display D means to rotate it on its central point being perpendicular to its screen, as shown in FIG. 19A. To "tilt" the display D means to swing it upward or downward, as shown in FIG. 19B. To "swivel" the display D means to swing it right or left, as shown in FIG. 19C.

Herein, the supporting body S includes a frame of buildings such as a wall, a beam or a floor, furniture such as a desk, and a stand on a floor, desk or the like.

In the following embodiments, the term "moment M" refers to a moment acting on a holding mechanism H due to the weight of the display D, as shown in FIG. 19B. In addition, the term "normal state" refers to a state where no forces exert the display D except its weight.

First Embodiment

Figure 1:
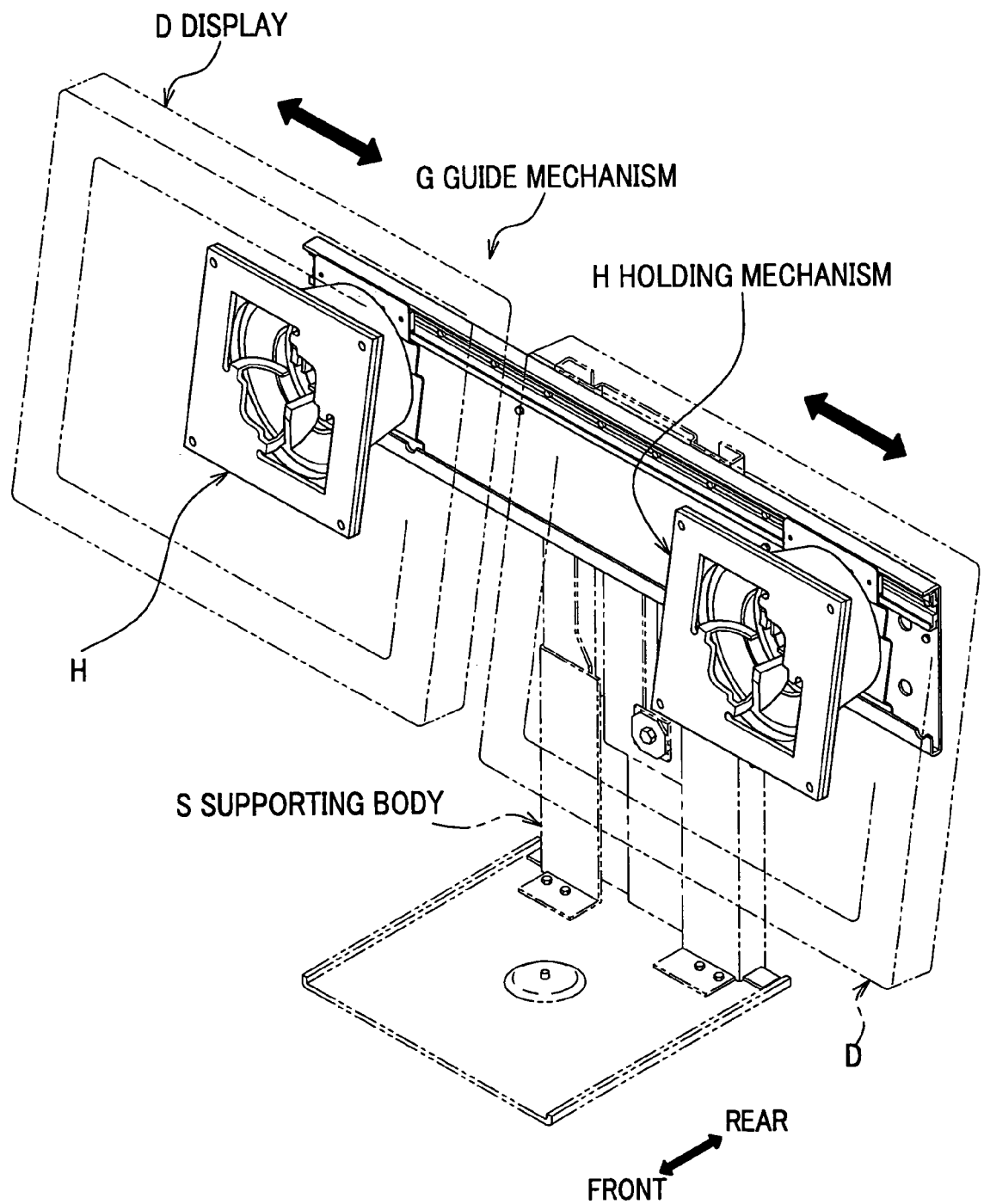
FIG. 1 is a perspective view depicting a display holding device according to a first embodiment of the present invention.

A display holding device according to a first embodiment is shown in FIG. 1. This display holding device includes a guide mechanism G and two holding mechanisms H, retaining at least one display D so as to move laterally, pivot, tilt and swivel. In this case, the guide mechanism G is positioned between the displays D and a supporting body S serving as a base, and is secured to the supporting body S. Note that the display holding device has the two holding mechanisms H and H in this embodiment, but the number of the holding mechanisms is not limited to two, and may be one or more than two.

The guide mechanism G includes a guide portion 1 spanning laterally and a stopper 2 formed parallel to the guide portion 1, as shown in FIG. 2.

Figure 3A:
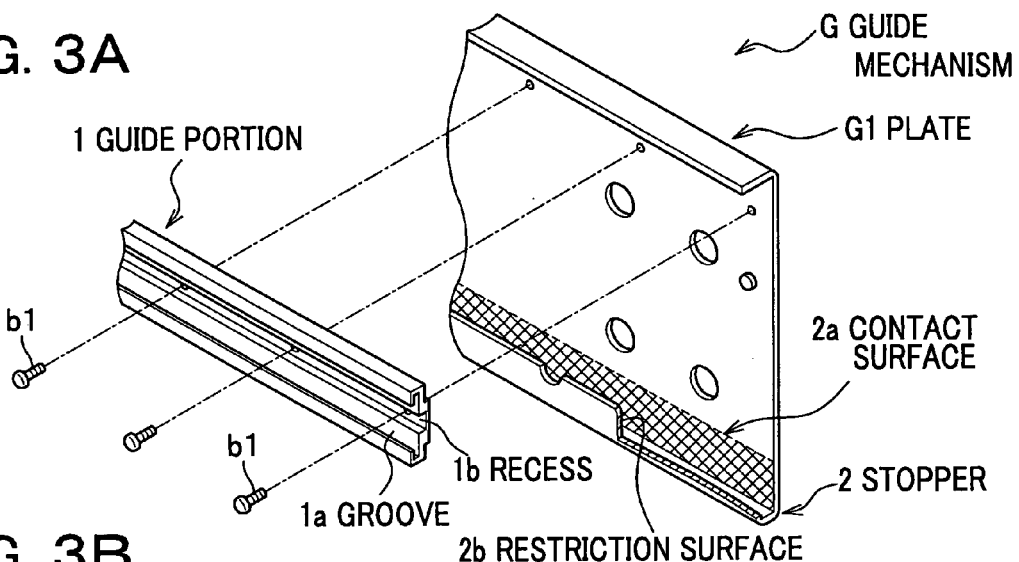
FIG. 3A is an exploded perspective view depicting a guide mechanism of the display holding device.

As shown in FIG. 3A, the guide portion 1 is made of a long member with an uneven surface, and is to be secured to the upper front surface of a plate G1 with screws (see FIG. 2). The guide portion 1 has a lip-shaped groove 1a and a recess 1b, the groove 1a being formed along the length of the guide portion 1 and on the front surface thereof, the recess 1b being formed along the length of the guide portion 1 to accommodate the heads of the screws b1.

The stopper 2 blocks a contact portion 4 from being displaced in the direction of the moment M (see FIG. 2), and allows it to be displaced in the opposite direction. The stopper 2 is located under the guide portion 1 and parallel thereto, as shown in FIG. 2. In this embodiment, the stopper 2 is a substantially U-shaped cross-sectional member formed on the lower front portion of the plate G1, as shown in FIG. 4A.

This stopper 2 includes a contact surface 2a and a restriction surface 2b. The contact surface 2a keeps in contact with the contact portion 4 in the normal state to thereby prevent it from being displaced in the direction of the moment M (i.e. of an arrow M). The restriction surface 2b is formed facing the contact surface 2a. Specifically, the stopper 2 blocks the contact portion 4 from being displaced backward, and allows it to be displaced forward.

The restriction surface 2b is formed in front of the contact surface 2a, and limits the displacement of the contact portion 4 in the opposite direction of the moment M so that the contact portion 4 is not displaced excessively.

The distance between the contact surface 2a and the restriction surface 2b is longer than the thickness of the contact portion 4 of the holding mechanism H. Specifically, a space is created in front of the contact portion 4, thereby enabling the contact portion 4 to be displaced forward. Due to this area, the contact portion 4 can be displaced in the opposite direction of the moment M (i.e. of the arrow M1). Note that the restriction surface 2b may be an option.

The plate G1 is made of a rectangular plate member, and its upper and lower edges are bent forward, as shown in FIG. 2. In addition, the plate G1 has four stays G2 to G2 to be secured to corresponding washers S1 and S1 on the supporting body S (see FIG. 2).

The holding mechanism H transmits, to the guide mechanism G, the moment M (see FIG. 4B) due to the weight of the display D (see FIG. 1). Furthermore, the holding mechanism H includes a slider 3, the contact portion 4, a moving portion 10 and a base 20 as shown FIG. 2, the slider 3 mating with the guide portion 1 in a slidable manner, the contact portion 4 being placed inside the stopper 2, the moving portion 10 being provided at the rear of the display D (see FIG. 1), the base 20 supporting the moving portion 10.

Figure 3B:
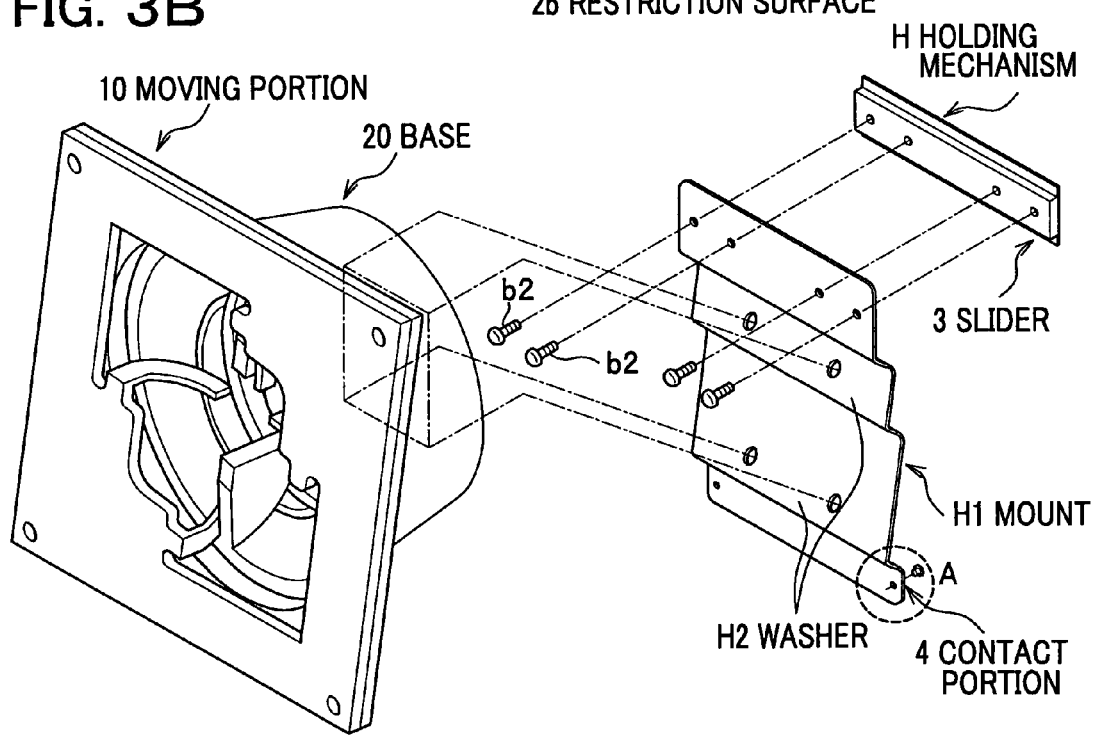
FIG. 3B is an exploded perspective view depicting a holding mechanism of the display holding device.

The slider 3 includes a slider main body 3a with an uneven surface, and friction reducing portions 3b and 3b, as shown in FIG. 4B, the friction reducing portions 3b and 3b being made of resins and being formed on the upper and lower parts of the slider main body 3a, respectively. Moreover, the slider 3 is attached to the guide portion 1 in such a way that the slider 3 is blocked from being displaced in the direction of the moment M (i.e. of the arrow M2), that is, in such a way that the slider 3 is prevented from being detached forward from the guide portion 1. As shown in FIG. 3B, the slider 3 is secured to a mount H1 with the screws b2 (see FIG. 2).

Figure 3C:
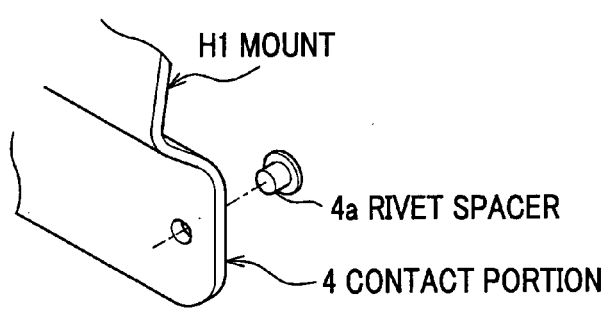
FIG. 3C is an enlarged view of a portion encircled in FIG. 3B.

The contact portion 4 is the lower part of the mount H1 and includes a pair of the rivet spacers 4a made of resins, as shown in FIG. 3C.

The mount H1 is made of a rectangular plate member, as shown in FIG. 3B, and includes the washers H2 and H2 for fixing the base 20.

Both the moving portion 10 and the base 20 enable the display D (see FIG. 1) to pivot, tilt or swivel. The moving portion 10 contains a support cap 30 and a baffle member 40 as shown in FIG. 5, the support cap 30 pressing the moving portion 10 toward a base 20, the baffle member 40 stopping the rotation of the support cap 30. In addition, the support cap 30 is provided with stoppers 50 for limiting the rotatable range of the moving portion 10. Note that the range in which the display D can pivot is limited to 90 degrees by both the moving portion 10 and the base 20 in this embodiment.

The moving portion 10 is composed of a metallic attachment plate 10A and a metallic flange 10B as shown in FIG. 6, the attachment plate 10A being secured to the rear of the display D, the flange 10B being fixed to the attachment plate 10A. Furthermore, the moving portion 10 is supported by the base 20 in such a way that the moving portion 10 can rotate on an axis P being substantially perpendicular to the screen of the display D. Note that the attachment plate 10A and the flange 10B each may not be a metal member, but may be a resin or other member.

The attachment plate 10A is provided with a frame portion 11 and a rotation restriction portion 12 that is located on the substantially center of the frame portion 11.

The frame portion 11 has a rectangular form, and has holes 11a at the individual corners.

Figure 7:
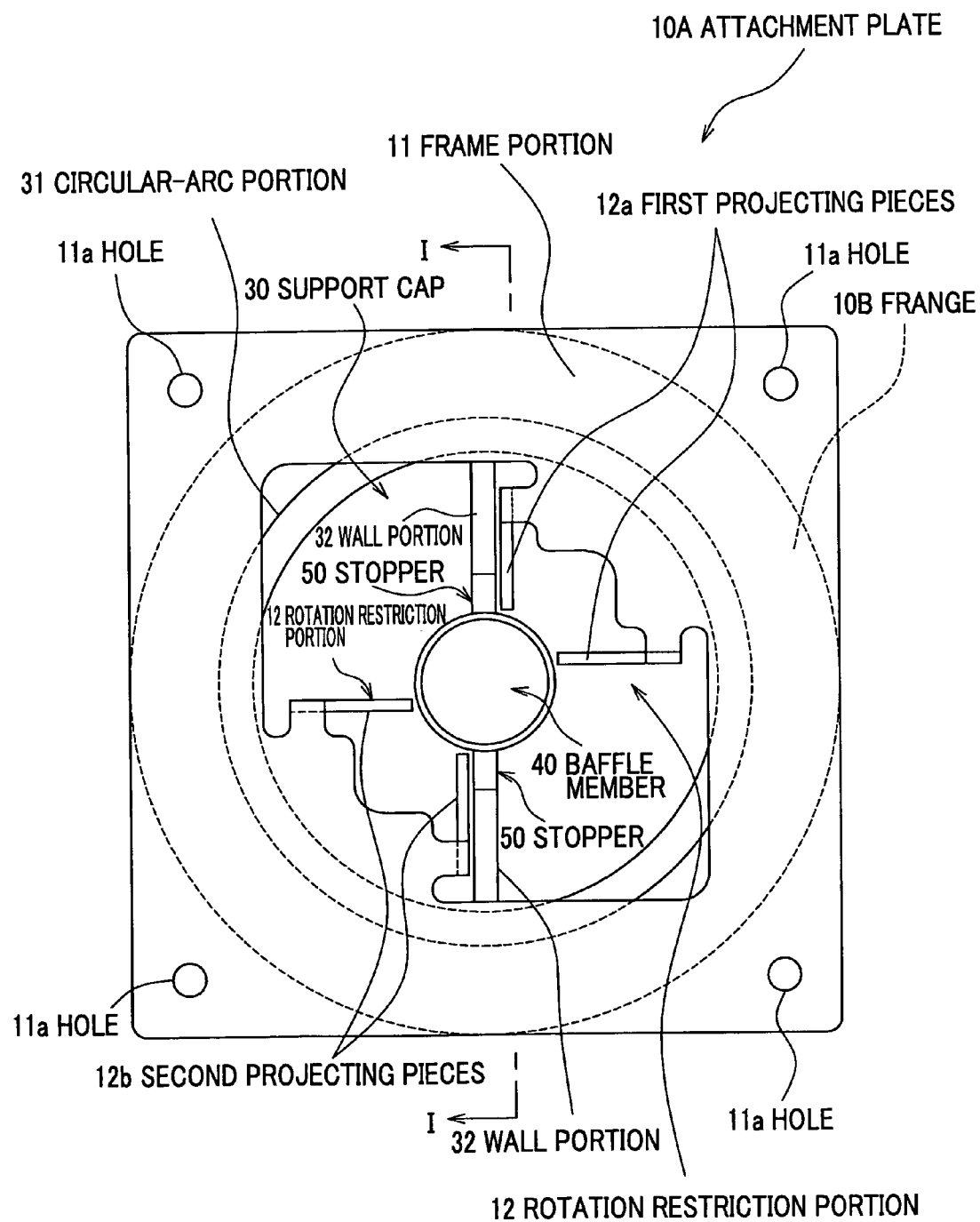
FIG. 7 is a view the holding mechanism, as seen from the front.

The rotation restriction portion 12 is composed of a pair of first projecting pieces 12a and 12a and a pair of second projecting pieces 12b and 12b, as shown in FIG. 7. The first projecting pieces 12a and 12a are located symmetric to the second projecting pieces 12b and 12b across wall portions 32 that will be described later. The individual first projecting pieces 12a and 12a are arranged perpendicular to each other. Similarly, the second projecting pieces 12b and 12b are perpendicular to each other. As shown in FIG. 6, the first projecting pieces 12a and 12a and the second projecting pieces 12b and 12b each protrude backward from the inner side of the frame portion 11 toward the center. Note that the structure and arrangement of the rotation restriction portion 12 are not limited to those shown in the figure, and can be modified as appropriately as long as being abutted on the sides of the wall portions 32 and 32 of the support cap 30.

The flange 10B is composed of a spherical portion 13 with a spherical surface, and a plate portion 14 formed around the spherical portion 13, as shown in FIGS. 5 and 6. In addition, the plate portion 14 has four holes 14*a* at the individual corners. The holes 14*a* are aligned with the corresponding holes 11*a* of the attachment plate 10A. Hereinafter, the rear and front surfaces of the spherical portion 13 (see FIGS. 5 and 6) are referred to as "base side sliding surface 13*a*" and "display side sliding surface 13*b*", respectively.

The base 20 is composed of a base body 20A and a spacer 20B as shown in FIGS. 5 and 6. The base body 20A is made of a synthetic resin and is secured to the washers H2 and H2 (see FIG. 3B) of the mount H1. The spacer 20B is made of a synthetic resin and is fitted into the aperture of the base body 20A. As shown in FIG. 2, the base 20, the slider 3 and the contact portion 4 are integrated.

The base body 20A includes a substantially circular bottom surface 21, a conical and trapezoidal circumferential wall 22, a pair of walls 23 and 23, and four holes 24 to 24, as shown in FIG. 6. The circumferential wall 22 is formed around the bottom surface 21. The walls 23 and 23 protrude from the bottom surface 21. The holes 24 to 24 are formed above the bottom surface 21. The bottom surface 21 has, at its center, an insert hole 21*a* into which an axis pole 42 of the baffle member 40 is to be inserted. The walls 23 and 23 face each other around the insert hole 21*a*. Each wall 23 has a U-shaped notch 23*a* in parallel with the axis P of axis pole 42 of the baffle member 40. The holes 24 and 24 are provided to fix the base 20 to the washers H2 and H2 of the mount H1 shown in FIG. 3B, and are aligned with the corresponding holes of the washers H2 and H2.

Figure 8:
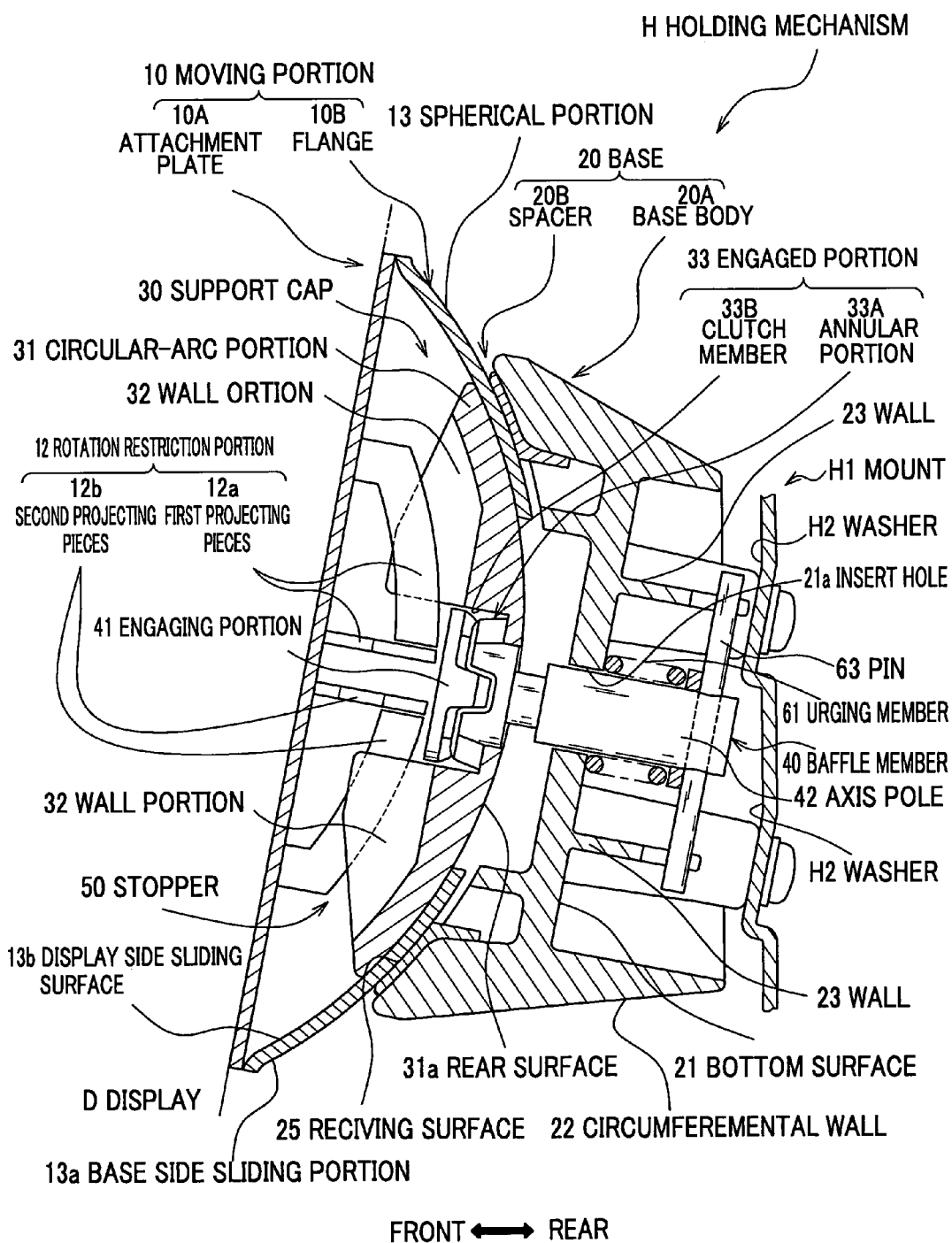
FIG. 8 is a cross-sectional view taken on line I-I of FIG. 7.

The spacer 20B has a cylindrical shape, and its front surface 25 (hereinafter referred to as "receiving surface 25") has the same curvature as the base side sliding surface 13*a* of the flange 10B. Accordingly, the receiving surface 25 is abutted on the base side sliding surface 13*a*, and can slide thereon, as shown in FIG. 8.

The support cap 30, made of a synthetic resin, includes a circular-arc portion 31, the wall portions 32 and 32, and an engaged portion 33, as shown in FIGS. 5 and 6. The wall portions 32 and 32 extrude from the front surface of the circular-arc portion 31. The engaged portion 33 is provided on the front surface of the circular-arc portion 31. As shown in FIG. 8, the support cap 30 is accommodated in the space between the attachment plate 10A and the flange 10B.

The circular-arc portion 31 has a rear surface 31*a* (herein referred to as "press surface 31*a*"), and this press surface 31*a* has the same curvature as the display side sliding surface 13*b* of the flange 10B (see FIG. 5). Hence, the press surface 31*a* is abutted on the display side sliding surface 13*b* and can slide thereon, as shown in FIG. 8. As shown in FIG. 6, the circular-arc portion 31 has an insert hole 31*b* at its center into which the axis pole 42 of the baffle member 40 is to be inserted.

The wall portions 32 and 32 face each other across the insert hole 31*b*, as shown in FIG. 5.

The engaged portion 33 is composed of an annular portion 33A formed around the insert hole 31*b*, and clutch members 33B inserted into this annular portion 33A, as shown in FIG. 5.

Figure 9:
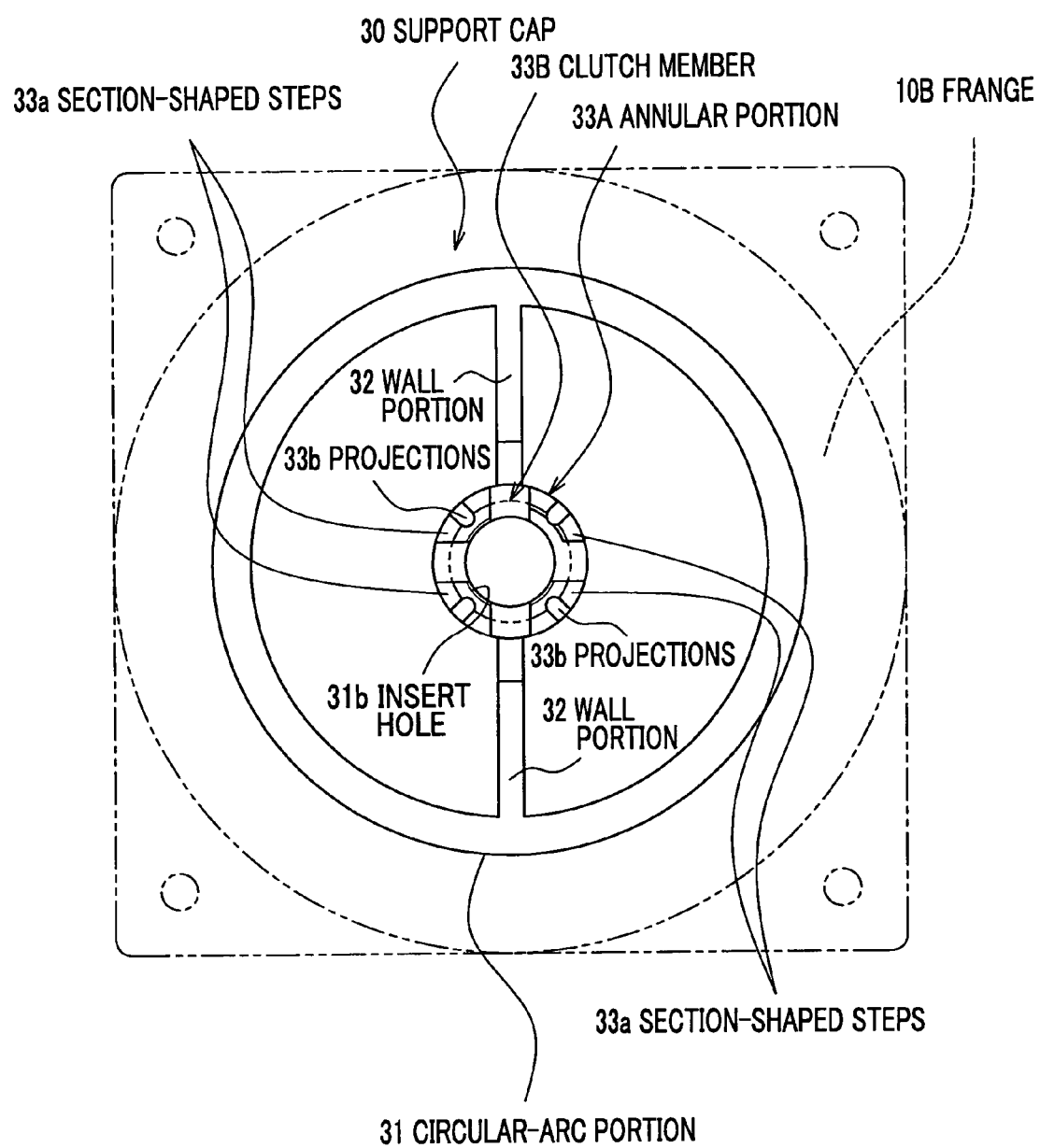
FIG. 9 is an elevational view depicting a support cap.

The annular portion 33A is formed by hollowing a region around the insert hole 31*b* on the front surface of the circular-arc portion 31. As shown in FIG. 9, the annular portion 33A has four sector-shaped steps 33*a* at regular intervals, and each sector-shaped step 33*a* has a projection 33*b* on its top.

As shown in FIGS. 10C and 10D, the clutch member 33B is made of a ring-shaped metal plate provided with four grooves 33*d* on the side of the annular portion 33A (see FIG. 10E). In addition, the clutch member 33B has sector plates 33*c* between the adjacent grooves 33*d* and 33*d*, and each sector plate 33*c* has a notch 33*e*. The notches 33*e* are arranged corresponding to the projections 33*b* of the annular portion 33A (see FIG. 10F). Once the clutch member 33B mates with the annular portion 33A, the projections 33*b* are fitted into the corresponding notches 33*e*, and the sector plates 33*c* are abutted on the corresponding section-shaped steps 33*a*. The grooves 33*d* are formed to be fitted into the corresponding spaces between the adjacent section-shaped steps 33*a* and 33*a* (see FIG. 10F). Once the clutch member 33B is fitted into the annular portion 33A, the grooves 33*d* are fitted into the corresponding spaces between the adjacent section-shaped steps 33*a* and 33*a* of the annular portion 33A. The hole of the clutch member 33B has the same inner diameter as the insert hole 31*b* of the circular-arc portion 31 (see FIG. 10F). As shown in FIG. 10C, a side 33*f* (hereinafter referred to as "engaged surface 33*f*") of each groove 33*d* is inclined with respect to the axis P of axis pole 42 of the baffle member 40 (see FIG. 10A).

The baffle member 40 is composed of an engaging portion 41 mating with the engaged portion 33 of the support cap 30, and the axis pole 42 provided at the end of the engaging portion 41, as shown in FIGS. 5 and 6.

The engaging portion 41 includes a base 41*d* and a head 41*c* as shown in FIGS. 10A and 10B, the base 41*d* having the same outer diameter as the diameter of central hole of the clutch member 33B, the head 41*c* being formed on the edge of the base 41*d*. The base 41*d* has four projections 41*a* on its circumference. The projections 41*a* are arranged corresponding to the grooves 33*d* of the clutch member 33B, and can mate with the grooves 33*d*. As shown in FIG. 10A, the side (hereinafter referred to as "abutted surface 41*b*") of each projection 41*a* is inclined with respect to the axis P of the axis pole 42. Once the projections 41*a* mate with the corresponding grooves 33*d* of the clutch member 33B, the projections 41*a* are abutted on the corresponding engaged surfaces 33*f* of the grooves 33*d* (see FIG. 10C).

The axis pole 42 includes a main body 42*a* and a slim body 42*b*, the main body 42*a* having the same diameter as the inner diameter of insert hole 21*a* of the base body 20A (see FIG. 8), the slim body 42*b* being located between the main body 42*a* and the base 41*d* of the engaging portion 41. The main body 42*a* has a pinhole 42*c* near its edge.

Figure 11:
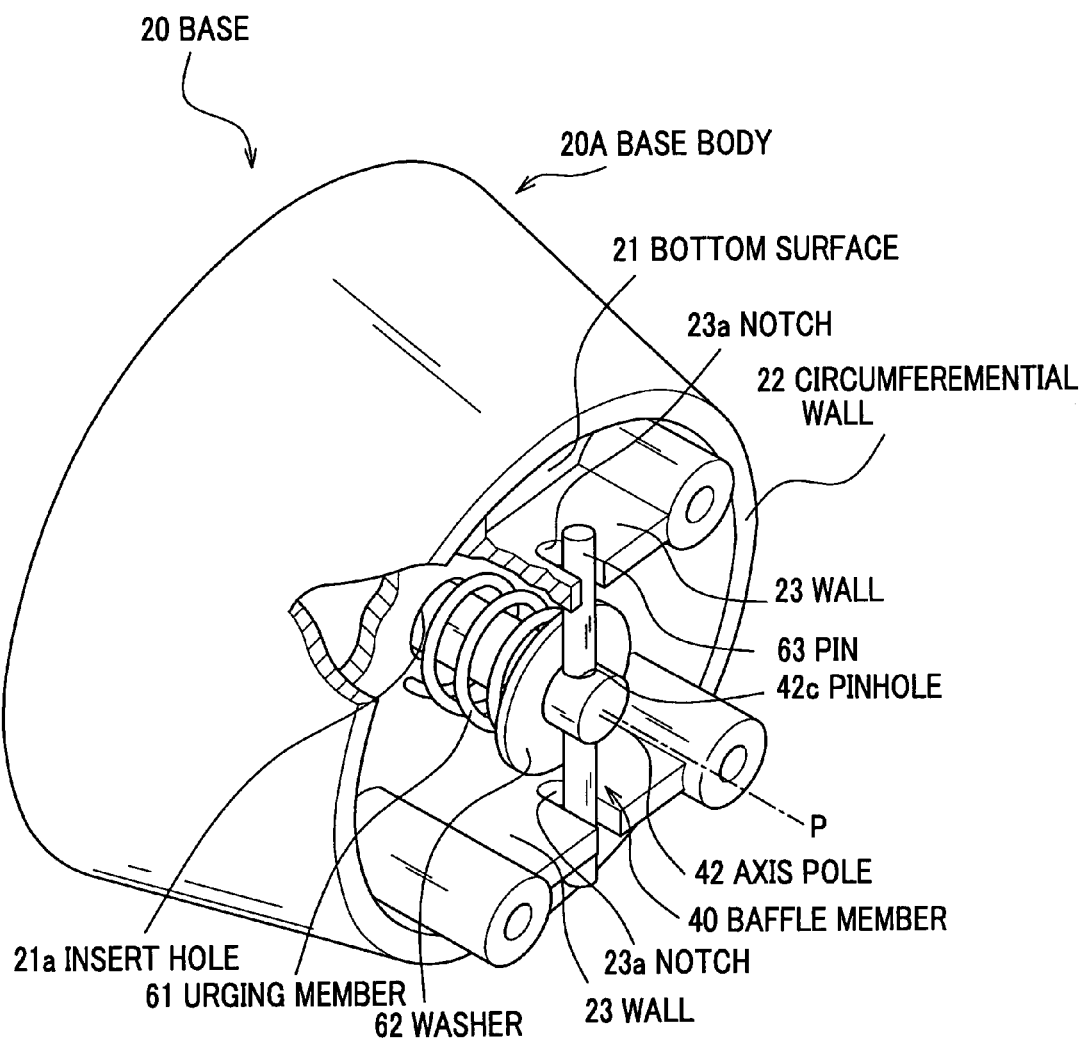
FIG. 11 is a partially cutaway view in perspective of the base, as seen from the rear.

The axis pole 42 is coupled to the base body 20A so that the axis pole 42 cannot rotate on the axis P but can be displaced forward. Concretely, as shown in FIG. 11, a pin 63 passes through the pinhole 42*c* of the axis pole 42, and both ends of the pin 63 are received into the notches 23*a* on the walls 23 and 23 of the base body 20A, respectively. Consequently, the axis pole 42 cannot rotate on the axis P, but can be displaced forward. In addition, the depths of the notches 23*a* are deeper than the diameter of the pin 63, and the notches 23*a* are formed parallel to the axis P.

As shown in FIG. 11, a compressed urging member 61 such as a coil spring is wrapped around the axis pole 42 and is located between the pin 63 and the bottom surface 21 of the base body 20A. In order for the urging member 61 to transmit the urging force surely to the axis pole 42, a washer 62 is provided between the urging member 61 and the pin 63. Note that the urging member 61 shown in this figure is a coil spring, but may be a plate spring or a belleville spring, for example.

The urging force (resilience) produced by the urging member 61 is transmitted to the axis pole 42 through the pin 63, as shown in FIG. 8. Because of this force, the engaging portion 41 is urged backward. This ensures that the engaging portion 41 mates with the engaged portion 33 of the support cap 30.

Since the engaging portion 41 mates with the engaged portion 33 of the support cap 30, the support cap 30 is also urged backward. In other words, the urging force produced by the urging member 61 acts on the support cap 30 through the baffle member 40 so that the support cap 30 presses the spherical portion 13 of the moving portion 10 backward.

As described above, the axis pole 42 of the baffle member 40 cannot rotate on the axis P, and the engaging portion 41 cannot rotate thereon, either. Therefore, the support cap 30 with which the engaging portion 41 mates cannot rotate on the axis P. Thus, as long as the engaging portion 41 mates with the engaged portion 33 of the support cap 30, the walls 32 and 32 of the support cap 30 are not displaced, whereby the walls 32 and 32 limit the rotatable range of the moving portion 10. In this embodiment, while the engaging portion 41 mates with the engaged portion 33 of the support cap 30, the walls 32 and 32 of the support cap 30 serve as stoppers 50 for limiting the rotatable range of the moving portion 10.

Unless the rotatable range of the moving portion 10 needs to be limited, the rotation restriction portion 12 of the moving portion 10, the walls 32 and 32 of the support cap 30 and the engaging portion 41 of the baffle member 40 may be all removed.

Next, a method for assembling the display holding device configured above will be described below.

To assemble the guide mechanism G, the guide portion 1 is secured to the front surface of the plate G1 with the screws b1, as shown in FIG. 3A.

To assemble the holding mechanism H, the slider 3 is secured to the rear surface of the mount H1 with screws b2, as shown in FIG. 3B. The base 20 to which the moving portion 10 is secured is then fixed to the washers H2 and H2 of the mount H1. Subsequently, the rivet spacers 4a are inserted to the corresponding holes on the mount H1, thereby constituting the contact portion 4, as shown in FIG. 3C.

To secure the holding mechanism H to the guide mechanism G, the holding mechanism H is placed next to the guide mechanism G, as shown in FIG. 2. The slider 3 and the contact portion 4 of the holding mechanism H are then inserted into the guide portion 1 and the stopper 2 of the guide mechanism G, respectively. In this case, stoppers (not shown) are attached to both ends of the guide portion 1, thereby preventing the holding mechanism H from being removed from the guide portion 1.

To secure the display holding device to the supporting body S, the stays G2 of the plate G1 are aligned with the corresponding washers S1 of the supporting body S. Following this, the screws b1 are inserted into the corresponding washers S1 through the plate G1, as shown in FIG. 2.

To secure the display to the display holding device, the rear surface of the display D is abutted on the front surface of the moving portion 10 of the holding mechanism H, as shown in FIG. 6, and fixing tools (not shown) are then inserted into the rear surface of the display D.

Next, a method for assembling the moving portion 10 and the base 20 will be described below in detail.

As shown in FIG. 5, the spacer 20B is inserted into the aperture of the base body 20A, and the spherical portion 13 of the flange 10B is sandwiched between the support cap 30 and the spacer 20B.

Subsequently, the clutch member 33B mates with the annular portion 33A of the support cap 30, thereby constituting the engaged portion 33. Following this, the axis pole 42 of the baffle member 40 is inserted into the insert hole 31b of the support cap 30 and the insert hole 21a of the base body 20A. The engaging portion 41 then mates with the engaged portion 33 of the support cap 30.

Next, as shown in FIG. 11, the urging member 61 and the washer 62 are wrapped around the axis pole 42 of the baffle member 40, which protrudes from the insert hole 21a of the base body 20A. Subsequently, the pin 63 is made to pass through the pinhole 42c of the axis pole 42 while the urging member 61 is compressed, and both ends of the pin 63 are then inserted into the respective notches 23a of the walls 23 and 23. As a result, the urging force produced by the urging member 61 acts on the support cap 30 through the baffle member 40, as shown in FIG. 8. In other words, the engaging portion 41 mates surely with the engaged portion 33 of the support cap 30, and the spherical portion 13 of the moving portion 10 is sandwiched between the base 20 and the support cap 30 with a pressing force of an appropriate magnitude.

Subsequently, as shown in FIG. 6, the attachment plate 10A is located in front of the flange 10B, and the holes 11a of the attachment plate 10A are aligned with the corresponding holes 14a of the flange 10B. Finally, the attachment plate 10A and the flange 10B are joined together, thereby completing assembling of the moving portion 10 and the base 20.

Next, a description will be given below of an effect, a movement and a handling method of the display holding device according to the first embodiment.

Figure 12A:
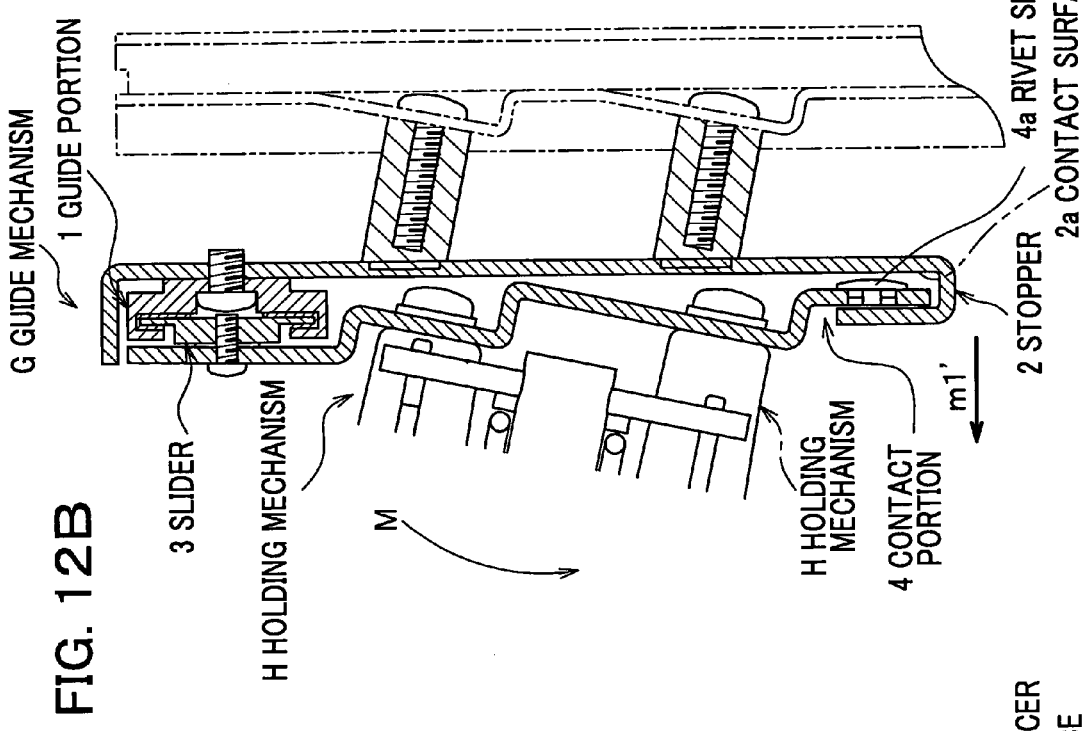
FIG. 12A is a cross-sectional view of the guide mechanism in a normal state.

In this display holding device, the holding mechanism H undergoes the moment M in the normal state, as shown in FIG. 12A. Therefore, unless this display holding device is supported by something, the holding mechanism H rotates in the direction of the moment M (i.e. of arrows m1 and m2 in this figure). In fact, the guide portion 1 prevents the slider 3 from being displaced in the direction of the arrow m2, while the contact surface 2a of the stopper 2 also prevents the contact portion 4 from being displaced in the direction of the arrow m1. Accordingly, the holding mechanism H does not rotate in the direction of the moment M, and as a result, the moment M is transmitted to the guide mechanism G.

Figure 13A:
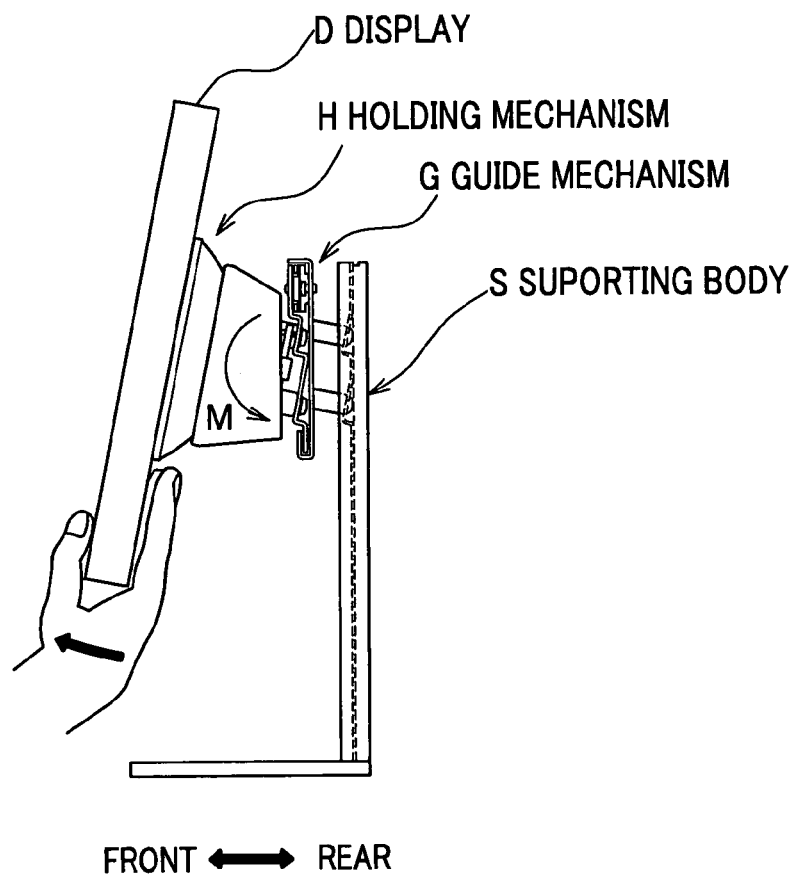
FIG. 13A is an illustration explaining a process of moving the display holding device.
Figure 13B:
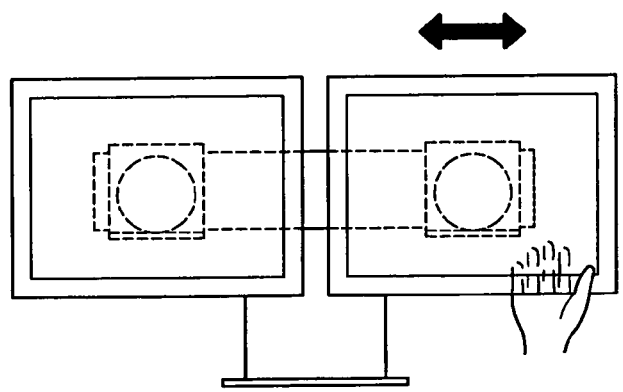
FIG. 13B is an illustration explaining a process of moving the display holding device.

To move the display D laterally, an operator slopes the display D in the opposite direction of the moment M (i.e. upward), while applying a lateral force to the display D. Specifically, the operator grasps the lower part of the display D and then pulls it, while applying a lateral force to the display D laterally (FIG. 13B).

Figure 12B:
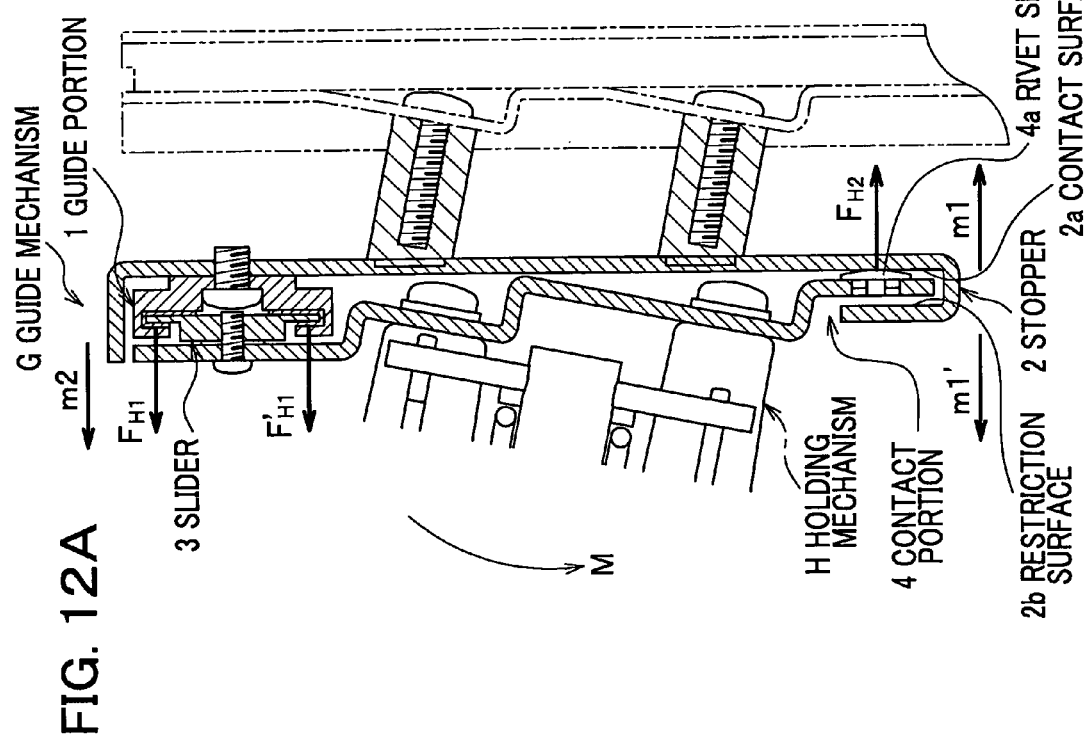
FIG. 12B is a cross-sectional view of the guide mechanism when an operator tries to move the display holding device laterally.

The more detail description will be given below. The contact portion 4 of the holding mechanism H is permitted to move in the opposite direction of the moment M (i.e. of the arrow m1), as shown in FIG. 12A. Therefore, when the lower part of the display D is pulled (see FIG. 13A), the holding mechanism H is inclined, and the rivet spacers 4a of the contact portion 4 come away from the contact surface 2a of the stopper 2, as shown in FIG. 12B. In this case, a horizontal force $F_{H2}$ (see FIG. 12A) due to the moment M does not act on the stopper 2. In other words, the contact portion 4 does not undergo any horizontal drag as a reaction force of the horizontal force $F_{H2}$. As a result, the contact portion 4 moves laterally, with experiencing little frictional force due to the moment M.

When an operator pulls the lower part of the display D (see FIG. 13A), the moment M applied on the display D is cancelled. Hence, little frictional force due to the moment M acts on the slider 3. On the condition the front surface of the contact portion 4 is abutted slightly on the restriction surface 2b (see FIG. 12A), or the contact portion 4 is placed within the space between the contact surface 2a and the restriction surface 2b, when an operator applies a lateral force to the display D, the display D moves laterally and smoothly (see FIG. 13B).

As described above, by allowing the contact portion 4 of the holding mechanism H to move in the opposite direction of the moment M, the frictional force applied to the holding mechanism H and the guide mechanism G can be minimized when the display D moves laterally. Consequently, it is possible to move the display D laterally and smoothly. In other words, with this display holding device, the display D can be retained with stability in the normal state, but can be moved smoothly when an operator tries to move it laterally. Furthermore, the two displays D and D can be retained by the respective the holding mechanisms H and H. Accordingly, both displays D and D can be moved together while both adjacent side surfaces keep in contact with each other, as well as they can move independently of each other.

As shown in FIG. 8, the spherical portion 13 of the moving portion 10 is sandwiched between the press surface 31a of the support cap 30 and the receiving surface 25 of the base 20 (spacer 20B) with a force of an appropriate magnitude. In addition, both the base side sliding surface 13a and the receiving surface 25 of the base 20 have a spherical surface. Also, the display side sliding surface 13b and the press surface 31a of the support cap 30 have a spherical surface. Accordingly, the spherical portion 13 of the moving portion 10 can slide freely while being sandwiched between the press surface 31a and the receiving surface 25. Specifically, the holding mechanism H according to this embodiment allows the display D to pivot, tilt or swivel (see FIGS. 19A, 19B and 19C). Since the two displays D and D are retained by the respective holding mechanisms H and H, they can tilt or swivel together while their adjacent side surfaces keep in contact with each other. In addition, they can also pivot, tilt or swivel independently of each other. Furthermore, the portrait and landscape-oriented displays D and D can be arranged adjacent to each other.

Figure 14A:
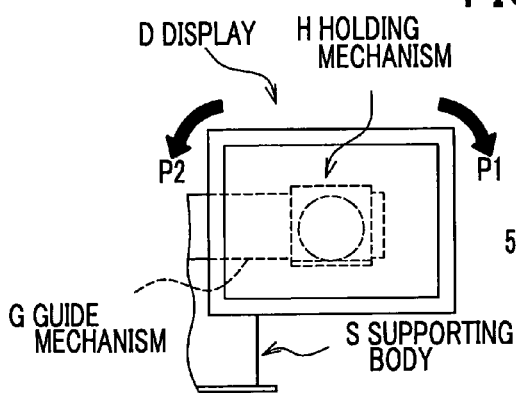
FIG. 14A is an illustration explaining a movement of the holding mechanism and depicting the condition of the display.
Figure 14B:
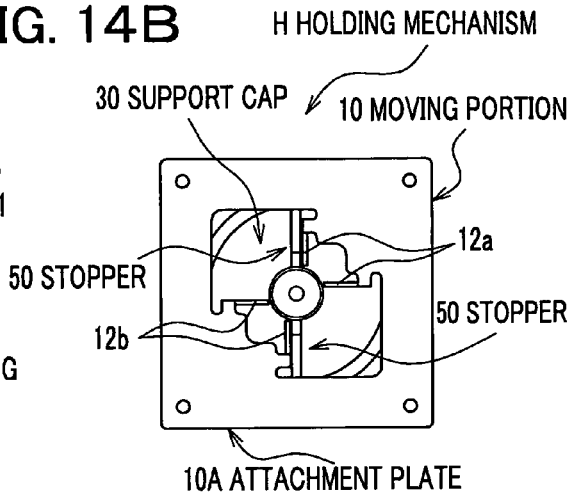
FIG. 14B is an elevational view depicting the holding mechanism in the state of FIG. 14A.
Figure 14C:
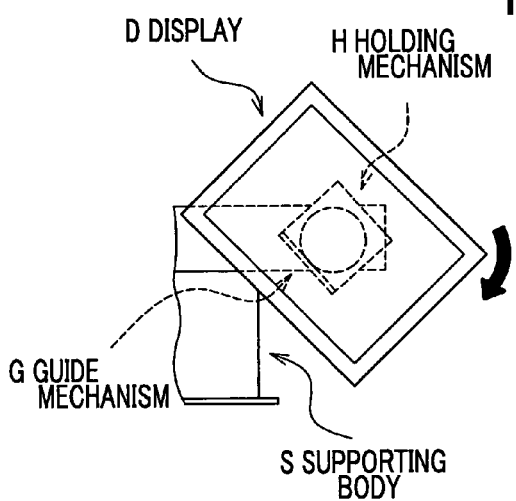
FIG. 14C is an illustration explaining the movement of the holding mechanism and depicting the condition of the display.
Figure 14D:
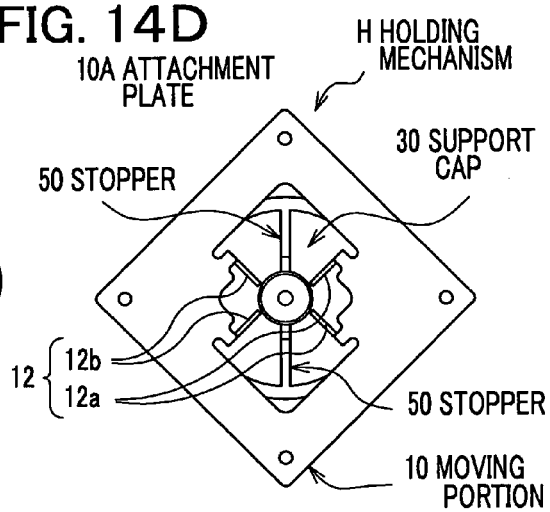
FIG. 14D is an elevational view depicting the holding mechanism in the state of FIG. 14C.
Figure 14E:
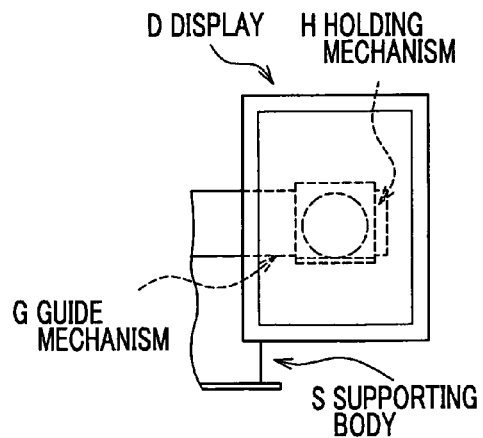
FIG. 14E is an illustration explaining the movement of the holding mechanism and depicting the condition of the display.

A description will be given below in detail of movements of the moving portion 10 and the base 20, as an example of the case where the orientation of the display D is changed from a landscape position (as shown in FIG. 14A) to a portrait position (as shown in FIG. 14E), by pivoting it clockwise by 90 degrees.

As shown in FIG. 14B, when the display D is in a landscape position, the rotation restriction portion 12 (one of the projecting pieces 12a and 12a and one of the projecting pieces 12b and 12b) are abutted on the stoppers 50 (walls 32 and 32) of the support cap 30. Specifically, the display D is blocked from pivoting counterclockwise (i.e. in the direction of an arrow P2 of this figure).

In this case, if the display D pivots clockwise (i.e. in the direction of an arrow P1 of this figure), then the support cap 30 does not rotate, but the moving portion 10 rotates together with the display D, as shown in FIG. 14D.

Figure 14F:
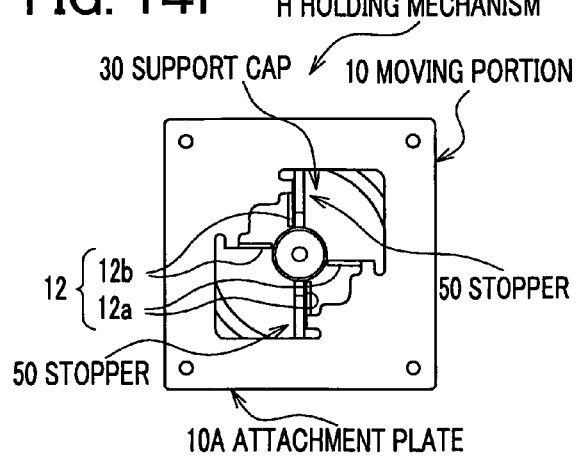
FIG. 14F is an elevational view depicting the holding mechanism in the state of FIG. 14E.

After the display D pivots, the rotation restriction portion 12 of the moving portion 10 is abutted on the stoppers 50, as shown in FIG. 14F, thereby blocking the moving portion 10 from further rotating.

Next, a description will be given below, with reference to FIG. 15, of movements of the moving portion 10 and the base 20, when the display D rotates counterclockwise by accident while the rotation of the moving portion 10 is blocked by the stopper 50.

Figure 15A:
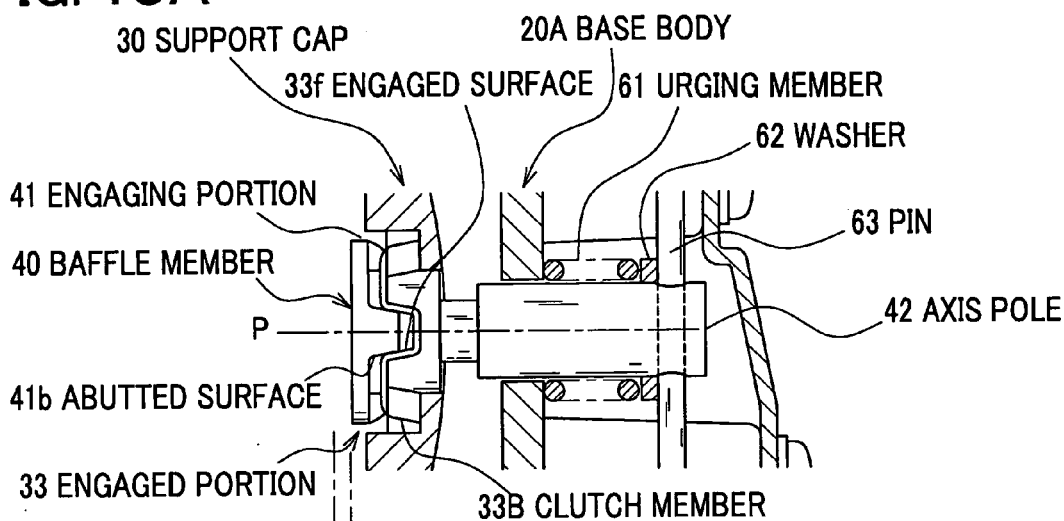
FIG. 15A is an enlarged cross-sectional view depicting the movement of the baffle member 40 in an emergency.

When the display D in the state of FIG. 14A undergoes a force counterclockwise (i.e. in the direction of the arrow P2), this force acts on the stopper 50, that is, the support cap 30, because the rotation restriction portion 12 of the moving portion 10 is abutted on the stopper 50 (see FIG. 14B). However, since the support cap 30 mates with the baffle member 40, as shown in FIG. 15A, the force acts on the engaging portion 41 of the baffle member 40.

In this case, because the abutted surface 41b (of engaging portion 41 of the baffle member 40) and the engaged surface 33f (of engaged portion 33 of the support cap 30) are both inclined, the engaging portion 41 is pressed forward (the left direction of this figure).

Figure 15B:
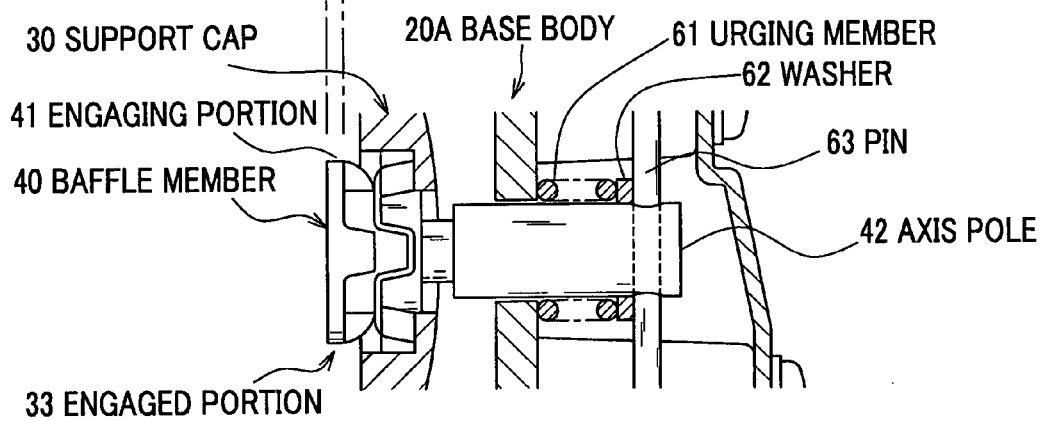
FIG. 15B is an enlarged cross-sectional view depicting the movement of the baffle member 40 in an emergency.

Following this, the engaging portion 41 of the baffle member 40 moves forward due to the above pressing force, as shown in FIG. 15B. This makes it possible to release the mating of the engaging portion 41 with the engaged portion 33 of the support cap 30. In this case, the urging member 61 is compressed more than usual.

Figure 16A:
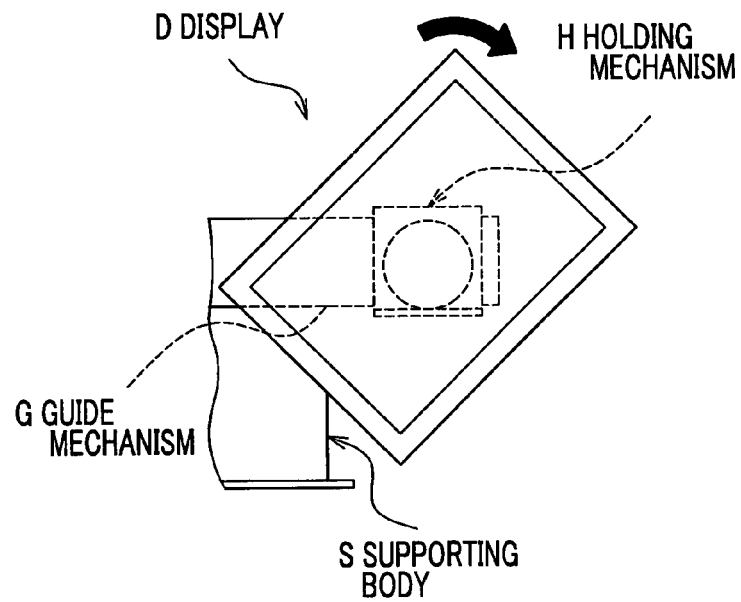
FIG. 16A is an illustration explaining the movement of the display in an emergency.
Figure 16B:
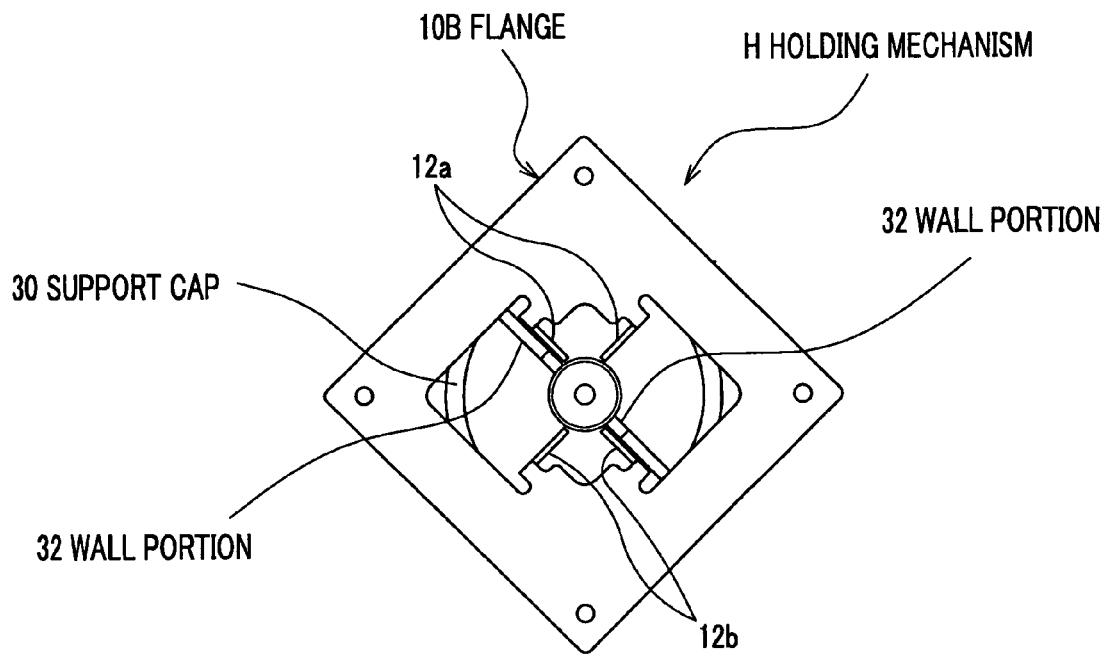
FIG. 16B is an elevational view depicting the holding mechanism in the state of FIG. 16A.

Once the above mating is released, the support cap 30 rotates together with the moving portion 10, as shown in FIG. 16B. In other words, the moving portion 10 is released from the block of the stopper 50 and, then can rotate beyond the rotatable range.

As described above, in the display holding device according to this embodiment, if a force of more than predetermined magnitude acts on the stoppers 50, then the holding mechanism H is released from the block of the stoppers 50, even if the holding mechanism H is blocked from rotating by the stoppers 50. Because of this structure, both the moving portion 10 and the support cap 30 are prevented from being damaged. In other words, while the moving portion 10 is positioned on the limit of the rotatable range, if a force of more than a predetermined magnitude acts on the stopper 50, then the engaging portion 41 of the baffle member 40 moves forward. Subsequently, the mating of the support cap 30 with the engaged portion 33 is released. As a result, the moving portion 10 moves beyond the rotatable range. This avoids the concentration of the force on both the moving portion 10 and the support cap 30, thereby preventing them from being damaged.

Moreover, the mechanism by which the mating of the engaged portion 33 of the support cap 30 with the engaging portion 41 of the baffle member 40 is released is very simple. This facilitates the assembly of the display holding device and ensures that the above mechanism works.

Even if a counterclockwise rotational force acts on the support cap 30, the support cap 30 does not rotate as long as the engaging portion 41 of the baffle member 40 mates with the engaged portion 33 of the support cap 30. Consequently, the position of the stoppers 50 is maintained. In other words, even if a counterclockwise rotational force acts on the support cap 30, the mating of the support cap 30 with the baffle member 40 is not released as long as the rotation force is lower than a predetermined magnitude. Consequently, the moving portion 10 does not rotate beyond the rotatable range.

After the mating is released, the support cap 30 mates with the baffle member 40 again by rotating the display D clockwise, as shown in FIG. 15A, because the baffle member 40 is always urged backward.

Figure 15C:
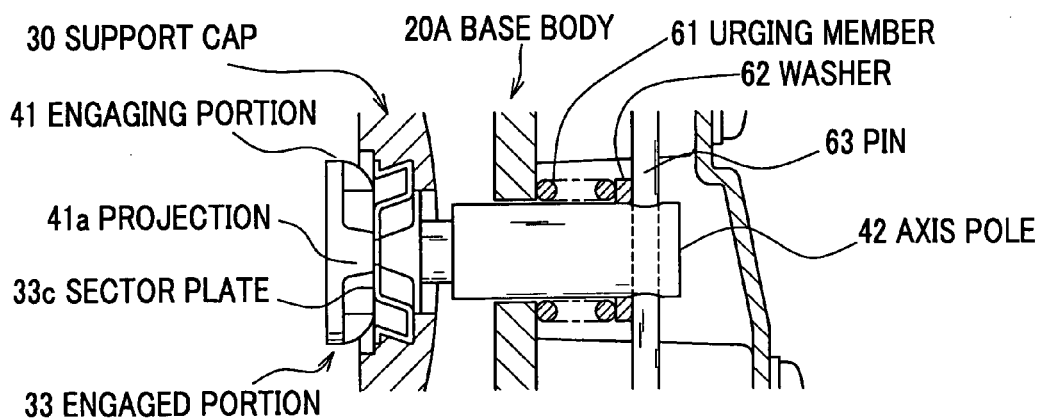
FIG. 15C is an enlarged cross-sectional view depicting the movement of the baffle member 40 in an emergency.

Even after the mating is released, the projections 41a of the engaging portion 41 still keeps in contact with the sector plate 33c of the clutch member 33B, as shown in FIG. 15C. Accordingly, the urging force produced by the urging member 61 is continuously transmitted to the support cap 30. In other words, even when the mating is released, the spherical portion 13 of the moving portion 10 is sandwiched with a force of an appropriate magnitude. Therefore, the force applied to the moving portion 10 is never lower than a necessary magnitude.

Furthermore, as shown in FIGS. 15A to 15C, when the mating is released, only the baffle member 40 among the components constituting the holding mechanism H moves forward, and neither the moving portion 10 nor the support cap 30 moves. Hence, a shock involved by the release is not delivered to the display D (see FIG. 1).

To adjust the magnitude of the rotation force for releasing the mating of the engaging portion 41 with the engaged portion 33, the angles of the abutted surface 41b (of engaging portion 41 of the baffle member 40) and of the engaged surface 33f (of engaged portion 33 of the support cap 30) are varied with respect to the rotation direction. Alternatively, the depth of the grooves 33d (see FIGS. 10C and 10D) of the clutch member 33B is adjusted. In this embodiment, the engaged portion 33 is configured by fitting the clutch member 33B into the annular portion 33A (see FIG. 10F) of the support cap 30. In the engaged portion 33, the magnitude of the rotation force can be varied merely by changing the dimensions such as the depth of the grooves 33d or the angle of inclination of the engaged surface 33f.

Alternatively, the magnitude of the rotation force can be varied by changing the spring constant of the urging member 6. Specifically, as the urging force is increased, the mating is hard to release. On the other hand, as the urging force is decreased, the mating is easy to release. This is because the engaging portion 41 needs to move forward against the urging force upon release from the mating.

As described above, the urging force produced by the urging member 61 is always transmitted to the support cap 30 through the baffle member 40. Because of this structure, the support cap 30 is always urged backward in the normal state where the engaging portion 41 of the baffle member 40 mates with the engaged portion 33, as well as in the state where this mating is released. In other words, the urging member 61 urges the support cap 30 backward in the normal state, adjusts the magnitude of the rotation force for releasing the mating of the baffle member 40 with the support cap 30, and prevents the moving portion 10 from rotating excessively when the mate is released. As described above, by providing the urging member 61 with multiple functions, it is possible to decrease the number of components, and to simplify the structure, thus reducing the cost.

Second Embodiment

In the first embodiment above, the stopper 2 is located under the guide 1, and the contact portion 4 is also located under the slider 3, as shown in FIGS. 12A and 12B. However, the position relationships of both the guide 1 and the stopper 2 and of both the slider 3 and the contact portion 4 are not limited in the present invention.

Figure 17:
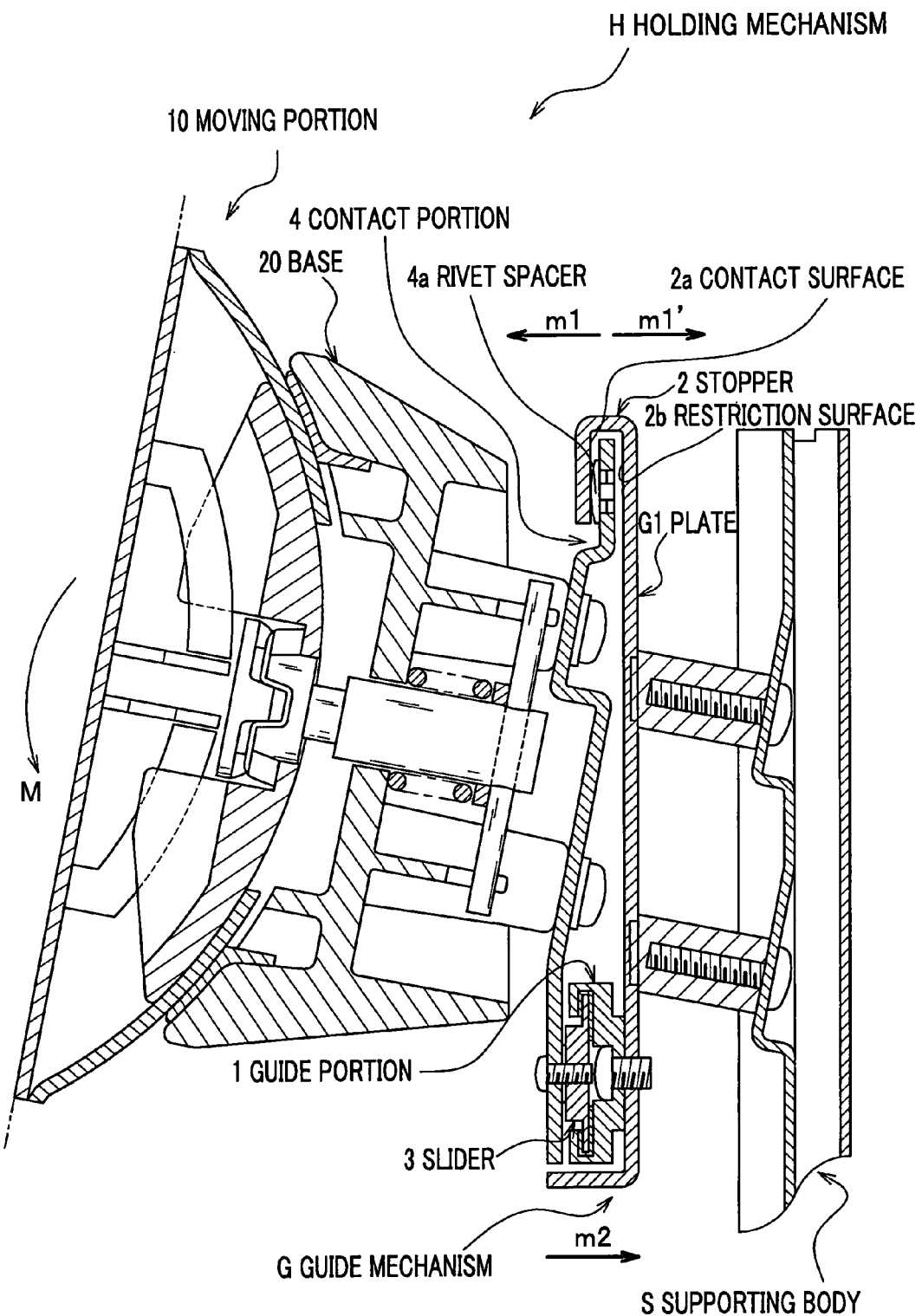
FIG. 17 is a side cross-sectional view depicting a display holding device according to a second embodiment of the present invention.

To give an example, a description will be given below of a display holding device according to a second embodiment. Referring to FIG. 17, in this display holding device, a stopper 2 is located over the guide 1, and contact portion 4 is also located over a slider 3.

In this embodiment, the stopper 2 is located on the upper portion of a plate G1 and has a substantial inverted U-shaped cross-sectional. The stopper 2 is composed of a contact surface 2a and a restriction surface 2b. The contact surface 2a keeps in contact with the contact portion 4 in the normal state, thereby blocking the contact portion 4 from being displaced in the direction of the moment M (i.e. if an arrow m1). The restriction surface 2b is formed facing the contact surface 2a. Thus, the stopper 2 prevents the contact portion 4 from being blocked forward, and allows it to be displaced backward.

The restriction surface 2b is formed in the rear of the contact surface 2a, and prevents the contact portion 4 from being displaced excessively in the direction of the moment M (i.e. of an arrow m1'). Thus, the restriction surface 2b limits the movable range of the contact portion 4.

The distance between the contact surface 2a and the restriction surface 2b is longer than the thickness of contact portion 4 of the holding mechanism H. This intends to create a space in the rear of the contact portion 4 in the normal state, the space enabling the contact portion 4 to be displaced within. Because of this space, the contact portion 4 can be displaced in the opposite direction of the moment M (i.e. of the arrow m1').

Note that the guide 1, the slider 3 and the contact portion 4 of the second embodiment differ from those of the first embodiment in their position relationships, but other structures are similar to one another.

In the display holding device according to the second embodiment configured above, the slider 3 is blocked by the guide 1 from being displaced in the direction of the moment M (i.e. of the arrow m2 of the figure) in the normal state. Also, the contact portion 4 is blocked by the contact surface 2a of the stopper 2 from being displaced in the direction of the moment M (i.e. of the arrow m1). As a result, the holding mechanism H does not rotate in the direction of the moment M (or the arrows m1 and m2 of the figure), and the moment M is therefore transmitted to the guide mechanism G.

To move the display laterally, an operator slops the display in the opposite direction of the moment M (i.e. upward), while applying a lateral force to the display. In other words, an operator grasps the upper part of the display and then pushes it, while applying a lateral force to the display.

The more detail description will be given below. When a pushing force acts on the upper part of the display, the holding mechanism H slants upward from the slider 3. In this case, the rivet spacers 4a of the contact portion 4 come away from the contact surface 2a of the stopper 2. While the contact portion 4 is apart from the contact surface 2a of the stopper 2, a frictional force 4 due to the moment M does not act on the contact portion 4 when the contact portion 4 moves laterally. If a pushing force acts on the upper portion of the display, then the frictional force due to the moment M does not act on the slider 3, either, because the moment M is cancelled. Consequently, on the condition that the rear surface of the contact portion 4 is abutted slightly on the restriction surface 2b, or the contact portion 4 is placed within the space between the contact surface 2a and the restriction surface 2b, when an operator applies a lateral force to the display, the display moves laterally and smoothly.

As described above, the contact portion 4 of the holding mechanism H can be displaced in the opposite direction of the moment M. This makes it possible to minimize the frictional force acting on the holding mechanism H and the guide mechanism G when the display moves laterally. In other words, it is possible to move the display laterally and smoothly. In conclusion, with the display holding device according to this embodiment, the display can be retained with stability, and can be moved smoothly when an operator tries to move it.

Third Embodiment

Figure 18:
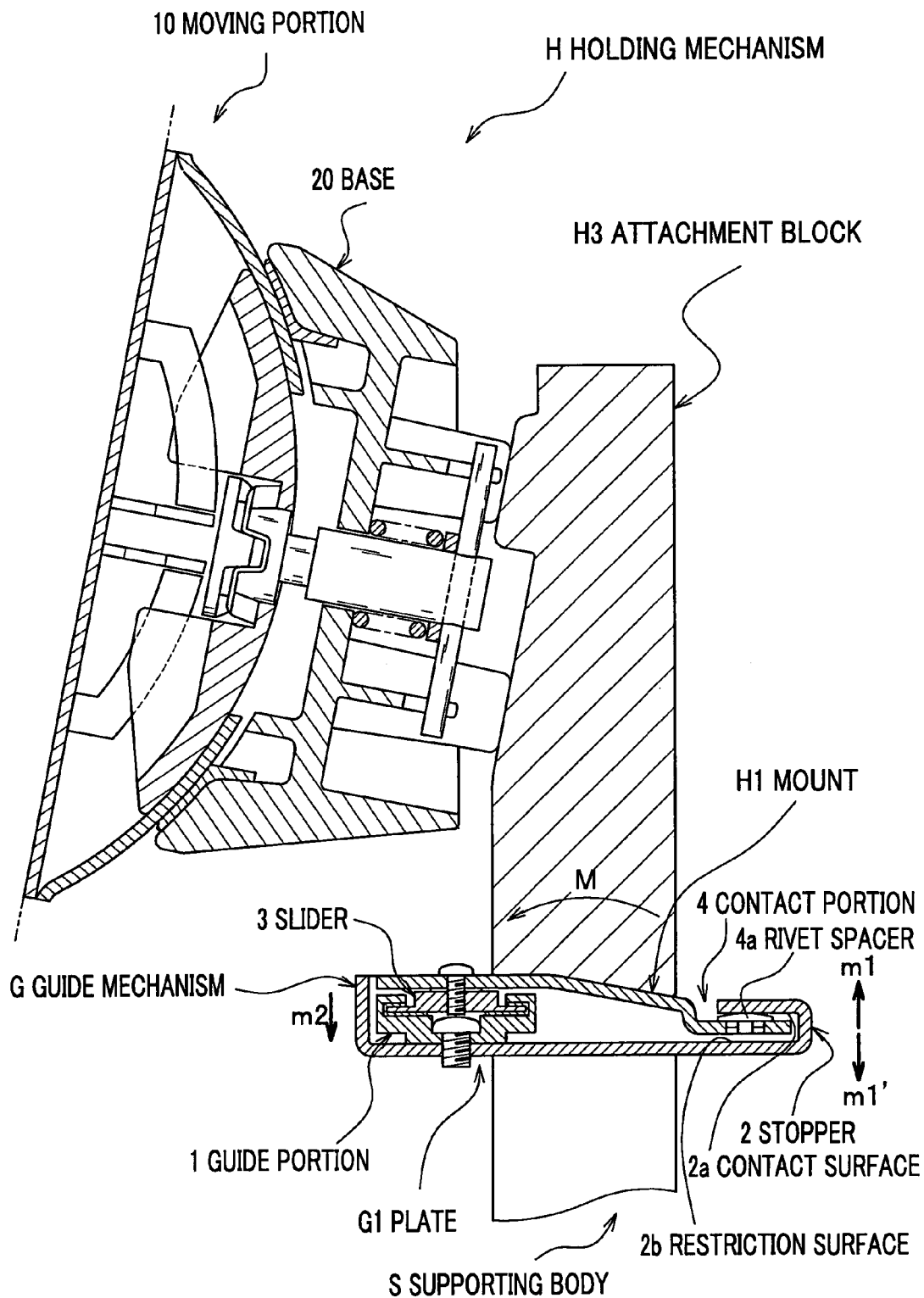
FIG. 18 is a side cross-sectional view depicting a display holding device according to a third embodiment of the present invention.
Figure 20A:
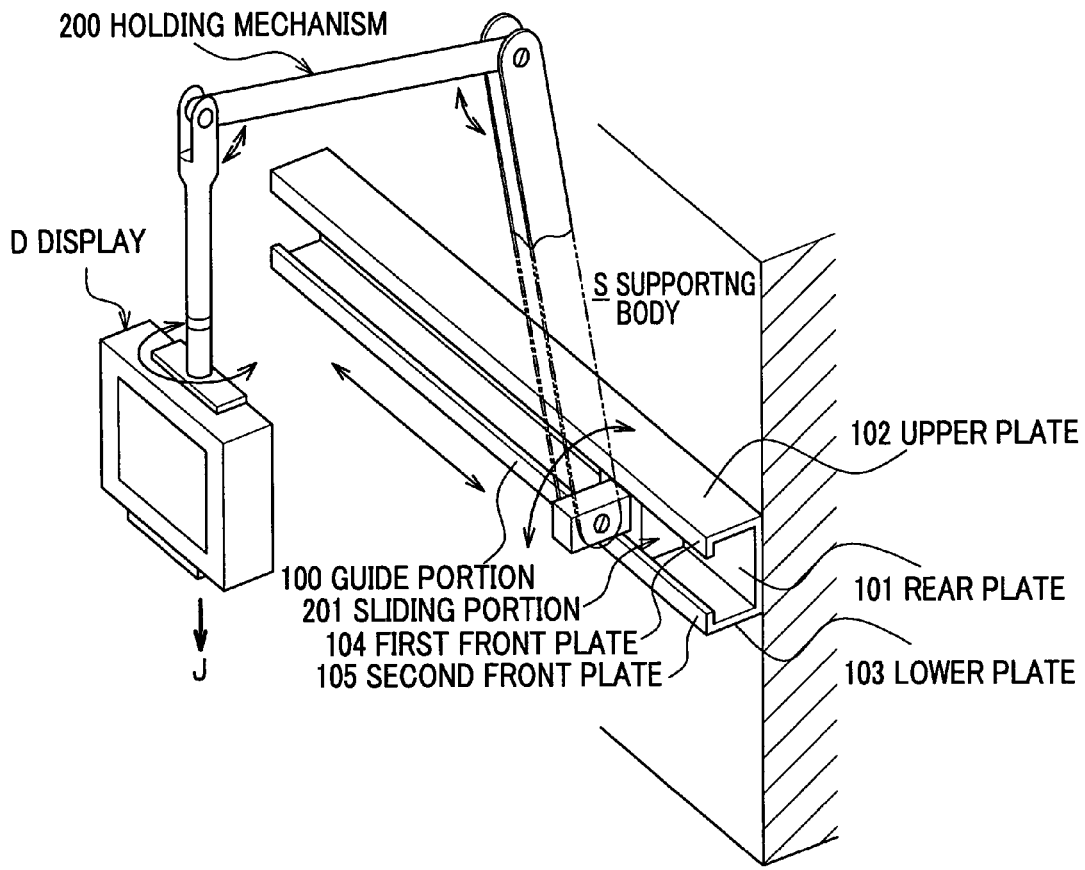
FIG. 20A is a perspective view depicting a conventional display holding device.
Figure 20B:
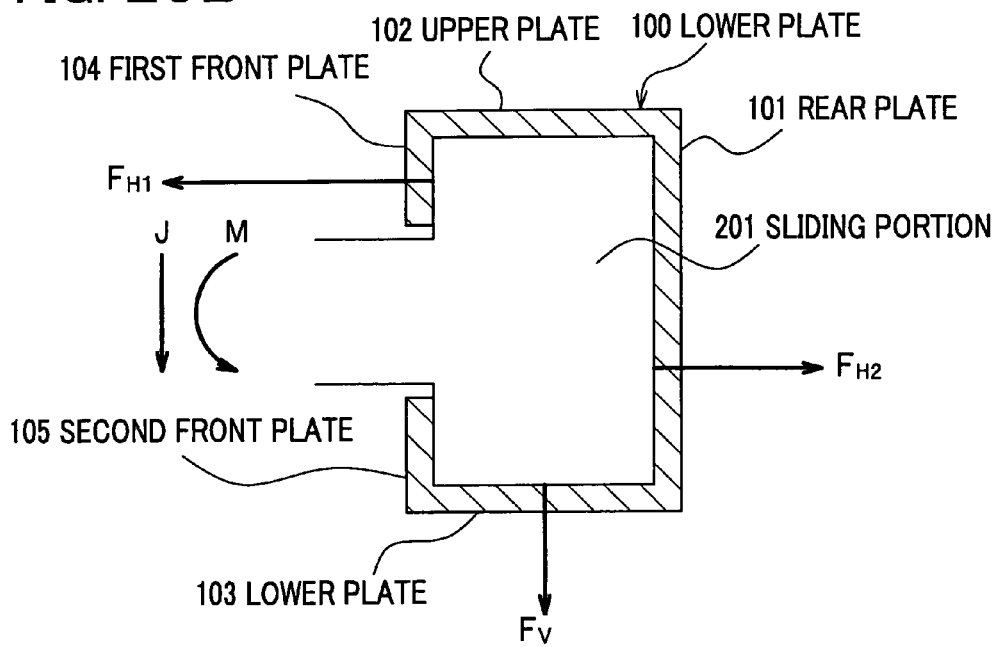
FIG. 20B is side cross-sectional view depicting a guide of the conventional display holding device and forces acting on the guide.

In the first and second embodiments described above, the guide 1 and the stopper 2 of the guide mechanism G are aligned vertically with each other, and the slider 3 and the contact portion 4 of the holding mechanism H are also aligned vertically with each other (see FIGS. 12 and 17). However, in a display holding device according to a third embodiment that will be described below, as shown in FIG. 18, a guide 1 and a stopper 2 of a guide mechanism G are aligned horizontally with each other, and a slider 3 and a contact portion 4 of a holding mechanism H are also aligned horizontally with each other. In this display holding device, the stopper 2 is located in the rear of the guide 1, and the contact portion 4 is located in the rear of the slider 3. In addition, a base 20 is secured to the front surface of an attachment block H3 installed on a mount H1 in a vertical position.

In this embodiment, the stopper 2, being formed on the rear part of the plate G1, has a substantial U shape cross-section. This stopper 2 is composed of a contact surface 2a and a restriction surface 2b. The contact surface 2a keeps in contact with the contact portion 4 in the normal state, thereby blocking the contact portion 4 from being displaced in the direction of the moment M (i.e. of an arrow m1). The restriction surface 2b is formed facing the contact surface 2a. Thus, the stopper 2 blocks the contact portion 4 from being displaced upward, and allows it to be displaced downward.

The restriction surface 2b is formed under the contact surface 2a, and prevents the contact portion 4 from being displaced excessively in the opposite direction of the moment M. Thus, this restriction surface 2b limits the movable range of the contact portion 4.

The distance between the contact surface 2a and the restriction surface 2b is longer than the thickness of contact portion 4 of the holding mechanism H. This intends to create a space under the contact portion 4 in the normal state, the space enabling the contact portion 4 to be displaced within. Because of this space, the contact portion 4 can be displaced in the opposite direction of the moment M (i.e. of the arrow m1').

Note that the guide 1, the slider 3 and the contact portion 4 of the third embodiment differ from those of the first embodiment in their position relationships, but other structures are similar to one another.

In the display holding device according to the third embodiment configured above, the slider 3 is blocked by the guide 1 from being displaced in the direction of the moment M (i.e. of the arrow m2 of the figure) in the normal state. Also, the contact portion 4 is blocked by the contact surface 2a of the stopper 2 from being displaced in the direction of the moment M (i.e. of the arrow m1). As a result, the holding mechanism H does not rotate in the direction of the moment M, and the moment M is transmitted to the guide mechanism G.

To move the display laterally, an operator slops the display in the opposite direction of the moment M (i.e. upward), while applying a lateral force to the display. In other words, an operator grasps the upper part of the display and then pushes it, or an operator grasps the lower part of the display and then pulls it, while applying a lateral force to the display.

The more detail description will be given below. When a pushing force acts on the upper part of the display, or when a pulling force acts on the lower part of the display, the holding mechanism H slants upward from the slider 3. In this case, the rivet spacers 4a of the contact portion 4 come away from the contact surface 2a of the stopper 2. While the contact portion 4 is apart from the contact surface 2a of the stopper 2, a frictional force 4 due to the moment M does not act on the contact portion 4 when the contact portion 4 moves laterally. If a pushing force acts on the upper portion of the display, or if a pulling force acts on the lower portion of the display, then the frictional force due to the moment M does not act on the slider 3, either, because the moment M is cancelled. Consequently, on the condition that the lower surface of the contact portion 4 is abutted slightly on the restriction surface 2b, or the contact portion 4 is placed within the space between the contact surface 2a and the restriction surface 2b, when an operator applies a lateral force to the display, the display moves laterally and smoothly.

As described above, the contact portion 4 of the holding mechanism H can be displaced in the opposite direction of the moment M. This makes it possible to minimize the frictional force acting on the holding mechanism H and the guide mechanism G when the display moves laterally. In other words, it is possible to move the display laterally and smoothly. In conclusion, with the display holding device according to this embodiment, the display can be retained with stability, and can be moved smoothly when an operator tries to move it.

Alternatively, the stopper 2 may be placed in front of the guide 1, and the contact portion 4 may be placed in front of the slider 2, although shown in the figures. In this case, the stopper 2 blocks the contact surface 2a from being displaced downward, and allows it to be displaced upward.

Moreover, in the above embodiments, among the individual components making up the display holding device, the components formed of metal materials may be formed of synthetic resins or other materials instead. Meanwhile, the components formed of synthetic resins may be formed of metal materials or other materials.

From the aforementioned explanation, those skilled in the art ascertain the essential characteristics of the present invention and can make the various modifications and variations to the present invention to adapt it to various usages and conditions without departing from the spirit and scope of the claims.

What is claimed is:

1. A display holding device being installed between at least one display and a supporting body that supports the display, comprising:
   a guide mechanism being secured to the supporting body, the guide mechanism including a guide portion extending in a first direction and a stopper extending in the first direction along the guide portion, the guide portion having a groove extending in the first direction; and
   at least one holding mechanism being secured to the display and including a slider and a contact portion, the slider mating with the groove in the guide portion of the guide mechanism and configured to slide in the first direction along the guide portion,
   wherein the stopper includes a contact surface extending in the first direction along the guide portion and facing the contact portion of the holding mechanism such that the contact portion is blocked from moving beyond the contact surface which prevents displacement in a direction of a moment caused by weight of the display.

2. The display holding device according to claim 1, wherein the holding mechanism comprises a moving portion secured to a rear surface of the display, and a base forming a single unit with the slider and the contact portion and supporting the moving portion in such a way that the moving portion rotates on an axis being substantially perpendicular to a screen of the display.

3. The display holding device according to claim 1, wherein the holding mechanism comprises a moving portion secured to a rear surface of the display, and a base forming a single unit with the slider and the contact portion, and wherein the moving portion has a spherical sliding surface on its rear, and the base has, on its front, a receiving surface being abutted on the sliding surface in a slidable manner.

4. The display holding device according to claim 1, wherein the stopper is placed below the guide portion.

5. The display holding device according to claim 1, wherein the stopper is placed above the guide portion.

6. The display holding device according to claim 1, wherein the stopper is configured to allow the contact portion to move in a direction opposite to the direction of the moment caused by weight of the display.

7. The display holding device according to claim 6, wherein the stopper has a restriction surface which blocks the contact portion from moving beyond the restriction surface in the direction opposite to the direction of the moment caused by weight of the display.

8. A display holding device installed between a display and a supporting body, comprising:
- a guide mechanism secured to the supporting body, the guide mechanism comprising a plate having a stopper formed in the plate and a guide portion mounted to the plate, the stopper extending in a longitudinal direction of the plate, the guide portion extending in the longitudinal direction along the stopper and having a groove extending in the longitudinal direction; and
- a holding mechanism secured to the display and including a mount having a contact portion and a slider mounted to the mount, the slider mating with the groove in the guide portion of the guide mechanism and configured to slide in the longitudinal direction along the guide portion,
- wherein the stopper includes a contact surface extending in the longitudinal direction along the guide portion and facing the contact portion of the holding mechanism such that the contact portion is blocked from moving beyond the contact surface which prevents displacement in a direction of a moment caused by weight of the display.

9. The display holding device according to claim 8, wherein the stopper is configured to allow the contact portion to move in a direction opposite to the direction of the moment caused by weight of the display.

10. The display holding device according to claim 9, wherein the stopper has a restriction surface which blocks the contact portion from moving beyond the restriction surface in the direction opposite to the direction of the moment caused by weight of the display.

11. The display holding device according to claim 8, wherein the holding mechanism comprises a moving portion secured to a rear surface of the display, and a base forming a single unit with the slider and the contact portion and supporting the moving portion in such a way that the moving portion rotates on an axis being substantially perpendicular to a screen of the display.

12. The display holding device according to claim 8, wherein the holding mechanism comprises a moving portion secured to a rear surface of the display, and a base forming a single unit with the slider and the contact portion, and wherein the moving portion has a spherical sliding surface on its rear, and the base has, on its front, a receiving surface being abutted on the sliding surface in a slidable manner.

13. The display holding device according to claim 8, wherein the guide portion and the stopper extend parallel with each other.

14. A display holding device installed between a display and a supporting body, comprising:
- a guide mechanism secured to the supporting body, the guide mechanism including a guide portion extending in a first direction and a stopper extending in the first direction along the guide portion, the guide portion having a groove extending in the first direction; and
- a holding mechanism secured to the display and including a slider and a contact portion, the slider mating with the groove in the guide portion of the guide mechanism and configured to slide in the first direction along the guide portion,
- wherein the stopper includes a contact surface extending in the first direction along the guide portion and facing the contact portion of the holding mechanism such that the contact portion is blocked from moving beyond the contact surface which prevents displacement in a direction of a moment caused by weight of the display, and the stopper includes a restriction surface extending in the first direction along the guide portion and facing the contact portion of the holding mechanism such that the contact portion is blocked from moving beyond the restriction surface which prevents displacement in a direction opposite to the direction of the moment caused by weight of the display.

15. The display holding device according to claim 14, wherein the stopper has a U shape comprising the contact surface and the restriction surface, and the contact portion of the holding mechanism is placed between the contact surface and the restriction surface of the stopper.

16. The display holding device according to claim 14, wherein the holding mechanism comprises a moving portion secured to a rear surface of the display, and a base forming a single unit with the slider and the contact portion and supporting the moving portion in such a way that the moving portion rotates on an axis being substantially perpendicular to a screen of the display.

17. The display holding device according to claim 14, wherein the holding mechanism comprises a moving portion secured to a rear surface of the display, and a base forming a single unit with the slider and the contact portion, and wherein the moving portion has a spherical sliding surface on its rear, and the base has, on its front, a receiving surface being abutted on the sliding surface in a slidable manner.

18. The display holding device according to claim 14, wherein the guide portion and the stopper extend parallel with each other.

19. The display holding device according to claim 14, wherein the direction of the moment caused by weight of the display is perpendicular to the first direction.

* * * * *